(12) United States Patent
Ozaki et al.

(10) Patent No.: US 6,940,579 B2
(45) Date of Patent: Sep. 6, 2005

(54) LIQUID CRYSTAL DISPLAY DEVICE AND DEFECT REPAIRING METHOD FOR THE SAME

(75) Inventors: Kiyoshi Ozaki, Yonago (JP); Tsuyoshi Kamada, Yonago (JP); Kouji Tsukao, Yonago (JP)

(73) Assignee: Sharp Corporation, Osaka (JP)

( * ) Notice: Subject to any disclaimer, the term of this patent is extended or adjusted under 35 U.S.C. 154(b) by 0 days.

(21) Appl. No.: 09/956,267

(22) Filed: Sep. 19, 2001

(65) Prior Publication Data

US 2002/0131010 A1 Sep. 19, 2002

(30) Foreign Application Priority Data

Mar. 14, 2001  (JP) ........................................ 2001-072012

(51) Int. Cl.[7] .............................................. G02F 1/13
(52) U.S. Cl. ........................... 349/192; 349/54; 349/39; 349/55; 349/144
(58) Field of Search ............................ 349/192, 54, 39, 349/55, 144, 73, 141, 43

(56) References Cited

U.S. PATENT DOCUMENTS

| | | | | |
|---|---|---|---|---|
| 5,159,476 A | * | 10/1992 | Hayashi ........................ | 349/39 |
| 5,182,661 A | * | 1/1993 | Ikeda et al. .................... | 349/38 |
| 5,276,540 A | * | 1/1994 | Okamoto et al. ............. | 349/39 |
| 5,648,826 A | * | 7/1997 | Song et al. .................... | 349/42 |
| 5,946,058 A | * | 8/1999 | Kamada et al. ............... | 349/42 |
| 5,955,744 A | * | 9/1999 | Gu et al. ........................ | 257/59 |
| 6,072,559 A | * | 6/2000 | Kanemori et al. ........... | 349/192 |
| 6,233,034 B1 | * | 5/2001 | Lee et al. ..................... | 349/141 |
| 6,278,503 B1 | * | 8/2001 | Nishikawa et al. ........... | 349/39 |
| 6,429,910 B1 | * | 8/2002 | Hirata et al. .................. | 349/54 |
| 6,476,881 B2 | * | 11/2002 | Ozaki et al. .................. | 349/43 |
| 6,515,720 B1 | * | 2/2003 | Iizuka et al. .................. | 349/39 |
| 6,573,532 B2 | * | 6/2003 | Park ............................. | 257/59 |

* cited by examiner

Primary Examiner—Tom Thomas
Assistant Examiner—Eugene Lee
(74) Attorney, Agent, or Firm—Greer, Burns & Crain, Ltd.

(57) ABSTRACT

The present invention relates to a liquid crystal display device and a defect repairing method for the same, and has an object to provide a liquid crystal display device in which a disconnection defect occurring in a storage capacitor bus line can be repaired without producing a new point defect, and a defect repairing method for the same. In the defect repairing method for the liquid crystal display device in which the disconnection defect of the storage capacitor bus line formed on a substrate is repaired, the method includes a step of forming disconnection repairing contact holes for exposing the storage capacitor bus line at both end portions of a disconnection of the storage capacitor bus line and in regions where a pixel electrode is not formed, and a step of forming a disconnection repairing conductive film for electrically connecting both the end portions of the disconnection through the disconnection repairing contact holes without short-circuiting the pixel electrode, and is constructed such that the disconnection defect is repaired by a disconnection repair path constituted by the disconnection repairing conductive film.

3 Claims, 25 Drawing Sheets

LIQUID CRYSTAL DISPLAY DEVICE AND DEFECT REPAIRING METHOD FOR THE SAME

BACKGROUND OF THE INVENTION

1. Field of the Invention

The present invention relates to a liquid crystal display device in which a disconnection defect occurring in a storage capacitor bus line in a manufacturing process of the liquid crystal display device used as a display device of a personal computer or the like can repaired, and a defect repairing method for the same.

2. Description of the Related Art

A liquid crystal panel of a liquid crystal display device has such a structure that two glass substrates of a TFT substrate on which thin film transistors (TFT) and the like are formed and a CF substrate on which color filters (CF) and the like are formed, are made opposite to each other, liquid crystal is sealed between them, and they are attached to each other.

On the TFT substrate, there are provided a plurality of gate bus lines, a plurality of drain bus lines intersecting with the gate bus lines through an interlayer insulating film, storage capacitor bus lines crossing pixel regions defined by the gate bus lines and the drain bus lines in parallel with the gate bus lines, and extraction lines (lead lines) for connecting the gate bus lines and the drain bus lines respectively to terminal portions for external connection. Incidentally, a TFT of which a drain electrode is connected to the drain bus line is formed in the vicinity of each of intersections of the respective bus lines. A source electrode of the TFT is connected to a pixel electrode disposed in each of the pixel regions.

In the liquid crystal display device, reduction in manufacturing costs is an important problem. For the reduction in costs, first, the improvement in manufacturing yield is intensely desired. One of causes for reducing the manufacturing yield of the liquid crystal display device is a disconnection defect occurring in a wiring pattern such as the storage capacitor bus line formed on the TFT substrate. The disconnection defect is repaired by a laser repair using a laser CVD (Laser Chemical Vapor Deposition) method, or the like.

Here, a conventional defect repairing method for a liquid crystal display device will be described with reference to FIGS. 28 to 30D. FIG. 28 is a plan view showing the defect repairing method for the liquid crystal display device in which a disconnection defect occurs in a storage capacitor bus line 515. As shown in FIG. 28, a plurality of drain bus lines 501 extending in the vertical direction in the drawing are formed on a substrate. Besides, a plurality of gate bus lines 503 indicated by broken lines extending in the horizontal direction in the drawing are formed on the substrate. Pixel regions are formed in regions defined by the drain bus lines 501 and the gate bus lines 503. A TFT 521 is formed in the vicinity of each of intersections of the respective drain bus lines 501 and the respective gate bus lines 503.

A drain electrode 517 of the TFT 521 is extended from the drain bus line 501 shown at the left side in the drawing, and its end portion is formed to be positioned at one end side on a channel protection film 505 formed on the gate bus line 503.

On the other hand, a source electrode 519 is formed to be positioned at the other end side on the channel protection film 505. In such a structure, a region of the gate bus line 503 just under the channel protection film 505 functions as a gate electrode of the TFT 521. Although not shown, a gate insulating film is formed on the gate bus line 503, and an active semiconductor layer constituting a channel is formed thereon.

Besides, storage capacitor bus lines 515 are formed in regions indicated by broken lines crossing substantially the centers of the pixel regions horizontally. A storage capacitor electrode 509 opposite to the storage capacitor bus line 515 through an insulating film is formed on an upper layer of the storage capacitor bus line 515 for each pixel. A pixel electrode 513 made of a transparent electrode is formed on an upper layer of the source electrode 519 and the storage capacitor electrode 509.

The pixel electrode 513 is electrically connected to the source electrode 519 through a contact hole 507 provided in a protection film formed thereunder. Besides, the pixel electrode 513 is electrically connected to the storage capacitor electrode 509 through a contact hole 511.

In the storage capacitor bus line 515 at the upper portion in the drawing, a disconnection defect occurs in one pixel at a disconnection portion 523. First, the drain electrode 517 of the pixel in which the disconnection occurs and the drain bus line 501 are cut away at a cut portion 526. Next, disconnection repairing contact holes 527 in which the storage capacitor bus line 515 is exposed are respectively formed at both end portions of the disconnection of the disconnection defect 523 and in regions where the pixel electrode 513 is not formed on the upper layer. Next, a disconnection repairing conductive film 529 for electrically connecting both the end portions of the disconnection is formed through the disconnection repairing contact holes 527 by a laser CVD method, and the disconnection defect of the storage capacitor bus line 515 is repaired. At this time, the disconnection repairing conductive film 529 is connected with the pixel electrode 513. Besides, in the storage capacitor bus line 515' at the lower portion in the drawing, a disconnection defect in a wide range occurs at a disconnection portion 525 extending over two pixels. The storage capacitor bus line 515' in which the disconnection defect occurs at the disconnection portion 525 is repaired similarly to the storage capacitor bus line 515.

The conventional defect repairing method for the liquid crystal display device in which the disconnection defect occurs in the storage capacitor bus line 515, will be described more specifically with reference to FIGS. 29A to 30D. FIGS. 29A to 30D show sections of the vicinity of the storage capacitor bus line 515 taken along line A–A' of FIG. 28. Incidentally, it is assumed that before the disconnection repairing contact holes 527 shown in FIG. 28 are formed, a disconnection inspection of the storage capacitor bus line 515 is carried out in advance, and as a result of the disconnection inspection, the disconnection portion 523 of the storage capacitor bus line 515 shown in FIG. 28 is found.

First, as shown in FIG. 29A, the storage capacitor bus line 515 is formed on a glass substrate 531. Here, the disconnection defect occurs in the storage capacitor bus line 515 at the disconnection portion 523. Next, an insulating film 533, an amorphous silicon (a-Si) layer 535, and a channel protection film formation layer 537 are formed in this order on the storage capacitor bus line 515. Next, a channel protection film formation layer 537 is patterned so that a channel protection film (not shown) is formed only on a gate electrode (not shown) (FIG. 29B).

Next, as shown in FIG. 29C, an n$^+$a-Si layer 539 and a metal layer 541 are continuously formed on the whole surface. Next, as shown in FIG. 29D, the metal layer 541, the n⁺a-Si layer 539 and the a-Si layer 535 are patterned by simultaneous etching to form the storage capacitor electrode (intermediate electrode) 509. Next, as shown in FIG. 30A, a protection film 543 is formed on the whole surface of the storage capacitor electrode 509. Next, as shown in FIG. 30B, a transparent conductive film is formed and is patterned, so that the pixel electrode 513 is formed.

Next, the drain electrode 517 of the pixel in which the disconnection defect occurs is cut away at the cut portion 526 and is separated from the drain bus line 501. Next, as shown in FIG. 30C, the disconnection repairing contact holes 527 in which the storage capacitor bus line 515 is exposed are formed at both end portions of the disconnection of the disconnection portion 523 and in regions where the pixel electrode 513 and the storage capacitor electrode 509 are not formed on the upper layer. Next, as shown in FIG. 30D, the disconnection repairing conductive film 529 for electrically connecting both the end portions of the disconnection is formed through the disconnection repairing contact holes 527 on the pixel electrode 513 by using the laser CVD method.

However, when the disconnection defect occurring in the storage capacitor bus line 515 is repaired by using the conventional defect repairing method for the liquid crystal display device as described above, as shown in FIG. 30D, the storage capacitor bus line 515 and the pixel electrode 513 are short-circuited through the disconnection defect repairing conductive film 529. Thus, although it is necessary to provide electrical insulation by cutting away the drain electrode 517 and the drain bus line 501 at the cut portion 526, there arises a problem that the pixel becomes a new point defect. Further, when the disconnection defect in a wide range extending over two or more pixels is repaired, similarly, there arises a problem that those pixels become a connecting point defect.

SUMMARY OF THE INVENTION

An object of the present invention is to provide a liquid crystal display device in which a disconnection defect occurring in a storage capacitor bus line can be repaired without producing a new point defect, and a defect repairing method for the same.

The above object is achieved by a defect repairing method for a liquid crystal display device in which a disconnection defect of a storage capacitor bus line formed on a substrate is repaired and which comprises a first step of forming disconnection repairing contact holes for exposing the storage capacitor bus line at both end portions of a disconnection of the storage capacitor bus line and in regions where a pixel electrode is not formed, and a second step of forming a disconnection repairing conductive film for electrically connecting both the end portions of the disconnection through the disconnection repairing contact holes without short-circuiting the pixel electrode, and is characterized in that the disconnection defect is repaired by a disconnection repair path constituted by the disconnection repairing conductive film.

Besides, the above object is achieved by a liquid crystal display device which is characterized by comprising an insulating substrate, pixel regions arranged in a matrix form on the substrate, storage capacitor bus lines formed to cross the pixel regions, storage capacitor electrodes formed to be opposite to the storage capacitor bus lines through an insulating film, and two divided pixel electrodes formed in each of the pixel regions above the storage capacitor electrode at both sides of an electrically separated separation region, each of the divided pixel electrodes being electrically connected to the storage capacitor electrode.

Further, the above object is achieved by a liquid crystal display device which is characterized by comprising an insulating substrate, a pixel electrode formed in each pixel region on the substrate, and a disconnection repairing conductive film electrically separated from the pixel electrode and formed around the pixel electrode.

DETAILED DESCRIPTION OF THE PREFERRED EMBODIMENTS

Figure 1:
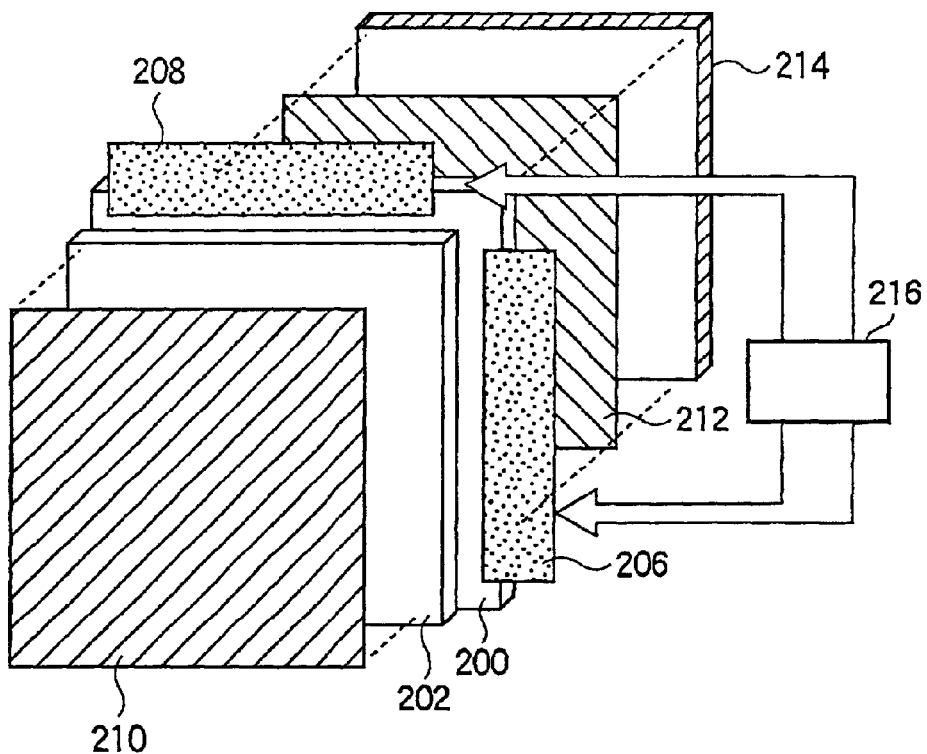
FIG. 1 is a view showing a schematic structure of a liquid crystal display device according to a first embodiment of the present invention.

A liquid crystal display device according to a first embodiment of the present invention and a defect repairing method for the same will be described with reference to FIGS. 1 to 12B. FIG. 1 shows a schematic structure of the liquid crystal display device of this embodiment. A liquid crystal panel has such a structure that two insulating glass substrates of a TFT substrate 200 on which thin film transistors (TFT) and the like are formed and a CF substrate 202 on which color filters (CF) and the like are formed, are made opposite to each other, liquid crystal is sealed between them, and they are attached to each other.

Figure 2:
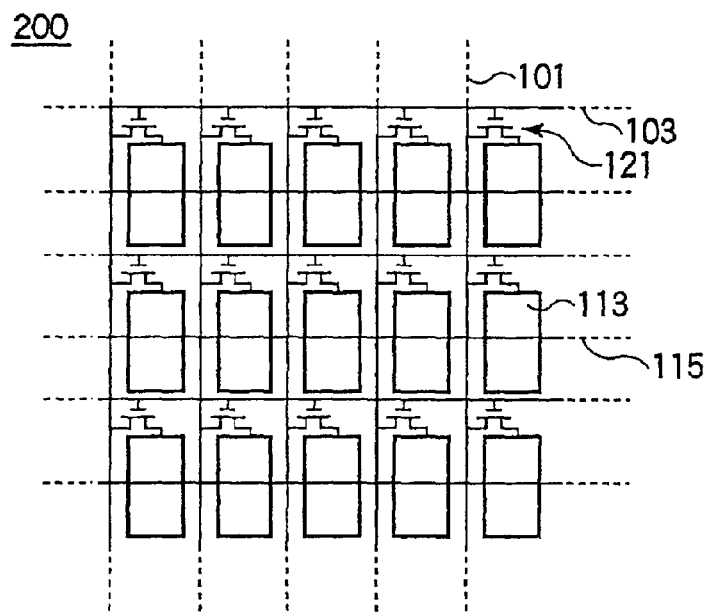
FIG. 2 is a view showing an equivalent circuit of an element formed on a TFT substrate of the liquid crystal display device according to the first embodiment of the present invention.

FIG. 2 shows an equivalent circuit of an element formed on the TFT substrate 200 of the liquid crystal display device of this embodiment. A plurality of gate bus lines 103 extending horizontally in the drawing are formed in parallel with each other on the TFT substrate 200, and a plurality of drain bus lines 101 intersecting with them at almost right angles and extending vertically in the drawing are formed in parallel with each other. Respective regions surrounded by the plurality of gate bus lines 103 and the drain bus lines 101 become pixel regions. TFTs 121 and pixel electrodes 113 made of transparent electrode material are formed in the pixel regions. A drain electrode of each of the TFTs 121 is connected to the adjacent drain bus line 101, a gate electrode is connected to the adjacent gate bus line 103, and a source electrode is connected to the pixel electrode 113. Storage capacitor bus lines 115 in parallel with the gate bus lines 103 are formed under the pixel electrodes 113 with respect to the substrate surface. The TFTs 121 and the respective bus lines 101, 103 and 115 are formed by a photolithography process, and are formed by repeating a series of semiconductor processes of "film formation→resist coating→exposure→development→etching→resist peeling".

Again in FIG. 1, a gate driving circuit 206 on which a driver IC for driving the plurality of gate bus line 103 is mounted, and a drain driving circuit 208 on which a driver IC for driving the plurality of drain bus lines 101 is mounted are provided on the TFT substrate 200 disposed to be opposite to the CF substrate 202 to seal the liquid crystal. The driving circuit 206 outputs scanning signals to a predetermined gate bus line 103 on the basis of a predetermined signal outputted from a control circuit 216. The driving circuit 208 outputs data signals to drain bus lines 101 on the basis of predetermined pixel signals outputted from a control circuit 216. A polarizing plate 212 is disposed on a substrate surface of the TFT substrate 200 opposite to an element formation surface, and a backlight unit 214 is attached to a surface of the polarizing plate 212 opposite to the TFT substrate 200. On the other hand, a polarizing plate 210 arranged in crossed Nicols with respect to the polarizing plate 212 is attached to a surface of the CF substrate 202 opposite to a CF formation surface.

Figure 3A:
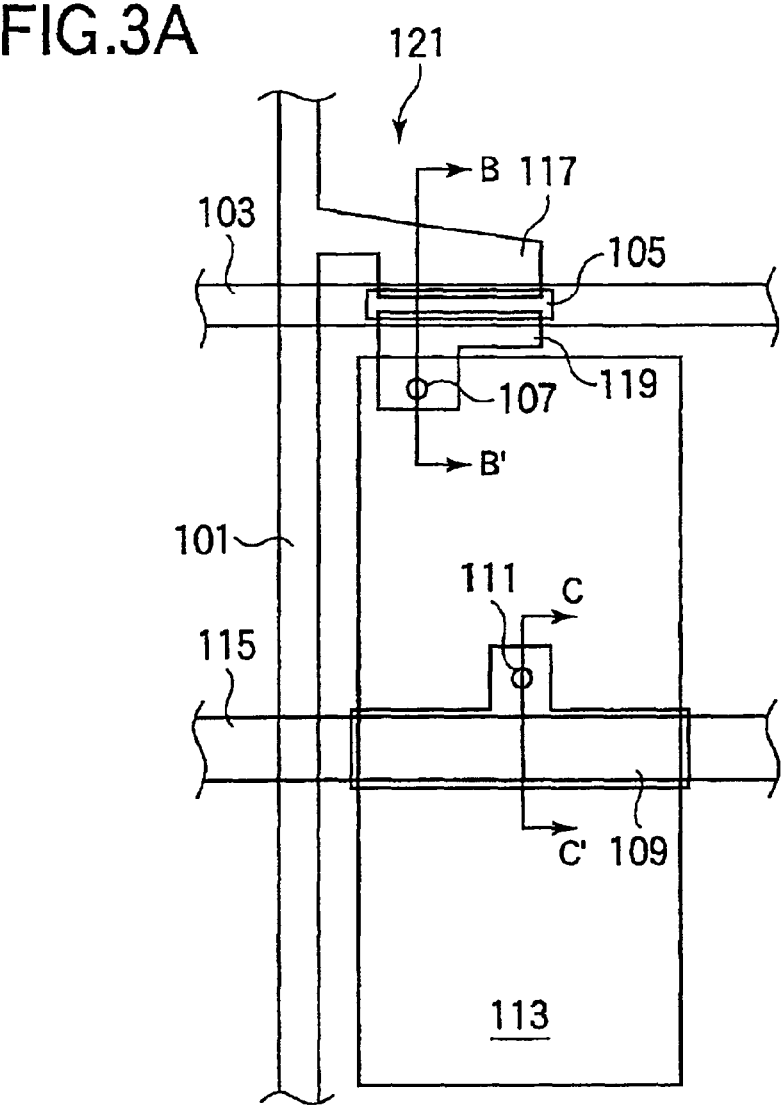
FIGS. 3A and 3B are views showing a schematic structure of a pixel region of the liquid crystal display device according to the first embodiment of the present invention.
Figure 3B:
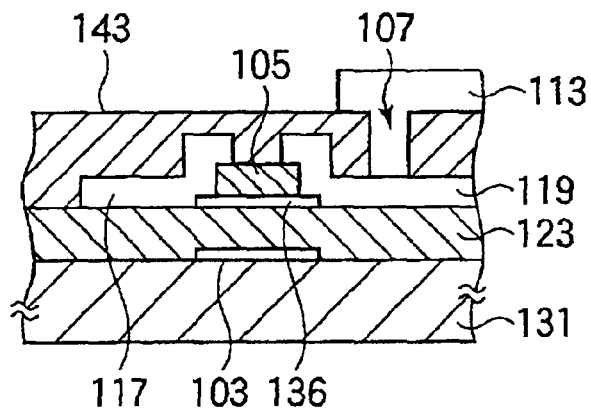

The structure of the TFT 121 includes an inverted staggered type in which source/drain electrodes are formed above a gate electrode with respect to a substrate surface and a staggered type or a planar type in which a gate electrode is formed above source/drain electrodes. FIGS. 3A and 3B show a schematic structure of a pixel region in which a typical inverted staggered TFT is provided. FIG. 3A expresses a pixel region seen toward the substrate surface, and FIG. 3B shows a section of the TFT 121 taken along line B–B' of FIG. 3A.

As shown in FIG. 3A, the TFT 121 is formed in the vicinity of a crossing position of the gate bus line 103 and the drain bus line 101. A drain electrode 117 of the TFT 121 is extended from the drain bus line 101, and its end portion is formed to be positioned at one end side of an active semiconductor layer 136 formed of a-Si or polysilicon (p-Si) above the gate bus line 103 and a channel protection film 105 formed thereon.

On the other hand, a source electrode 119 is formed to be positioned at the other end side of the active semiconductor layer 136 and the channel protection film 105. In the structure like this, the gate bus line 103 just under the channel protection film 105 functions as a gate electrode of the TFT 121.

Besides, as shown in FIG. 3B, a gate insulating film 123 is formed on the gate bus line 103, and the active semiconductor layer 136 constituting a channel is formed on the gate insulating film 123 just above the gate bus line 103.

Again in FIG. 3A, the storage capacitor bus line 115 extending horizontally at substantially the center of the pixel region is formed. A storage capacitor electrode 109 is formed on an upper layer of the storage capacitor bus line 115 through a protection film 143 for each pixel. The pixel electrode 113 made of a transparent electrode of ITO (Indium Tin Oxide) or the like is formed on an upper layer of the source electrode 119 and the storage capacitor electrode 109. The pixel electrode 113 is electrically connected to the source electrode 119 through a contact hole 107 provided in the protection film 143 formed under the pixel electrode. Besides, the pixel electrode 113 is electrically connected to the storage capacitor electrode 109 through a contact hole 111.

Although the above-described TFT structure is the inverted staggered type, for example, in the staggered type or the planar type, the structure is inverted such that a drain electrode is provided at the undermost layer, and a gate electrode is provided above that.

Next, a method for manufacturing the liquid crystal display device according to this embodiment will be described with reference to FIGS. 4A to 9B. Incidentally, in FIGS. 4A to 9B, structural elements having the same function and operation as structural elements shown in FIGS. 1 to 3B are designated by the same characters and the explanation is omitted. FIGS. 4A, 5A, 6A, 7A, 8A and 9A show sections of the TFT 121 taken along line B–B' of FIG. 3A, and FIGS. 4B, 5B, 6B, 7B, 8B and 9B show sections of the vicinity of the storage capacitor bus line 115 taken along line C–C' of FIG. 3A.

Figures 4A, 4B:
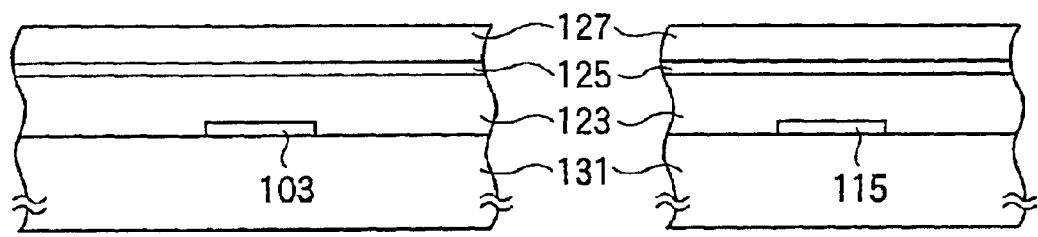
FIGS. 4A and 4B are process sectional views showing a manufacturing method for the liquid crystal display device according to the first embodiment of the present invention.

First, as shown in FIGS. 4A and 4B, for example, aluminum (Al) is formed on the whole surface of a transparent glass substrate 131 to form a metal layer having a thickness of about 150 nm. Next, patterning is carried out by using a first mask to form a gate bus line 103 (see FIG. 4A) and a storage capacitor bus line 115 (see FIG. 4B). Next, for example, a silicon nitride film (SiN film) is formed on the whole surface of the substrate by a plasma CVD method to form a gate insulating film 123 having a thickness of about 400 nm. Next, for example, an a-Si layer 125 having a thickness of about 15 nm, for formation of an active semiconductor layer, is formed on the whole surface of the substrate by the plasma CVD method. Subsequently, for example, a SiN film 127 having a thickness of about 120 nm, for formation of a channel protection film, is continuously formed by the plasma CVD method.

Figures 5A, 5B:
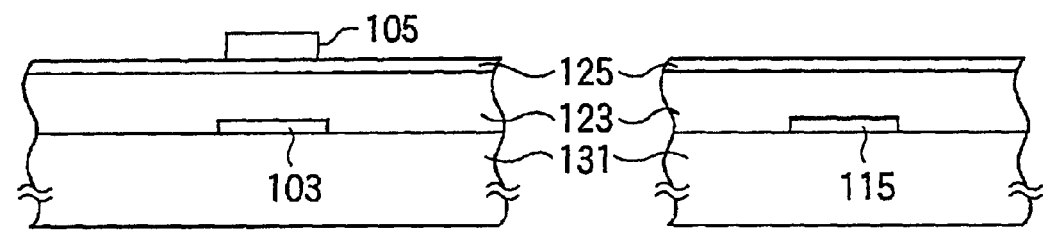
FIGS. 5A and 5B are process sectional views showing the manufacturing method for the liquid crystal display device according to the first embodiment of the present invention.

Next, back exposure to the transparent glass substrate 131 is carried out while the gate bus line 103 and the storage capacitor bus line 115 are used as masks, and further, exposure using a second mask is carried out to form a resist pattern (not shown) on the gate bus line 103 in a self aligning manner, and the SiN film 127 formed over the gate bus line 103 and the storage capacitor bus line 115 is etched to form a channel protection film 105 over the gate bus line 103 of a TFT formation region (see FIGS. 5A and 5B).

Figures 6A, 6B:
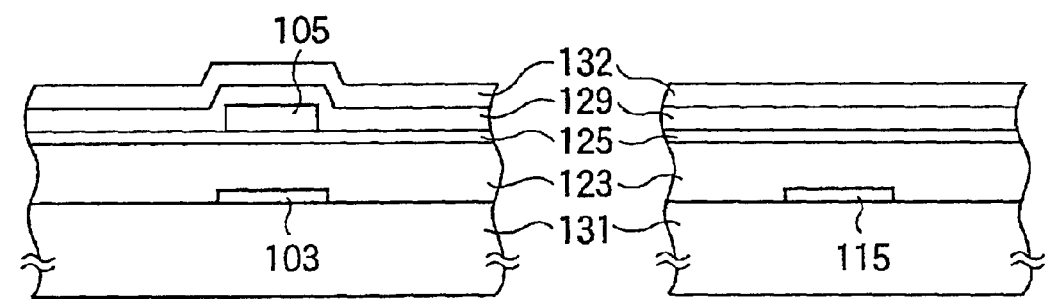
FIGS. 6A and 6B are process sectional views showing the manufacturing method for the liquid crystal display device according to the first embodiment of the present invention.

Next, as shown in FIGS. 6A and 6B, an n⁺a-Si layer 129 for formation of an ohmic contact layer of a thickness of about 30 nm is formed on the whole surface by the plasma CVD method. Next, a metal layer (for example, a chromium (Cr) layer) 132 having a thickness of about 170 nm, for formation of a drain electrode 117, a source electrode 119, a storage capacitor electrode 109, and a drain bus line 101, is continuously formed by sputtering.

Figure 7A:
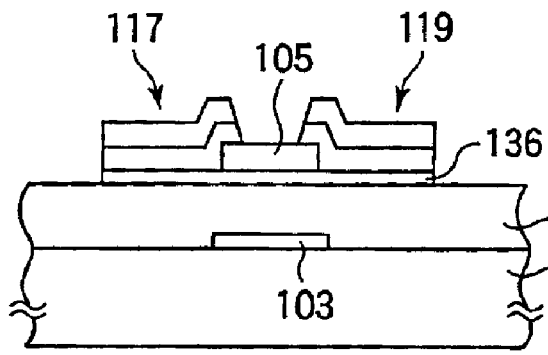
FIGS. 7A and 7B are process sectional views showing the manufacturing method for the liquid crystal display device according to the first embodiment of the present invention.
Figure 7B:
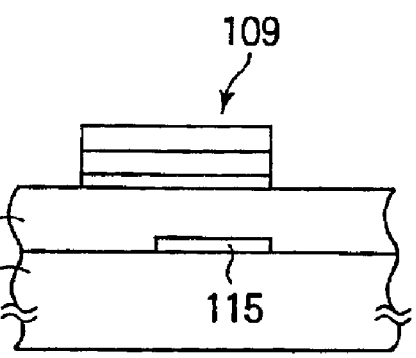

Next, as shown in FIGS. 7A and 7B, the metal layer 132, the n⁺a-Si layer 129, and the a-Si layer 125 are patterned by using a third mask to form the drain bus line 101 (not shown in FIGS. 7A and 7B), the drain electrode 117, the source electrode 119, the storage capacitor electrode 109, and an active semiconductor layer 136. In the etching treatment in this patterning, the channel protection film 105 functions as an etching stopper, and the a-Si layer 125 under the film is not etched but remains.

Figure 8A:
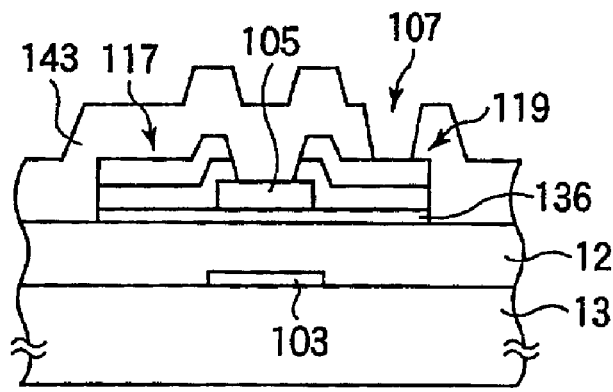
FIGS. 8A and 8B are process sectional views showing the manufacturing method for the liquid crystal display device according to the first embodiment of the present invention.
Figure 8B:
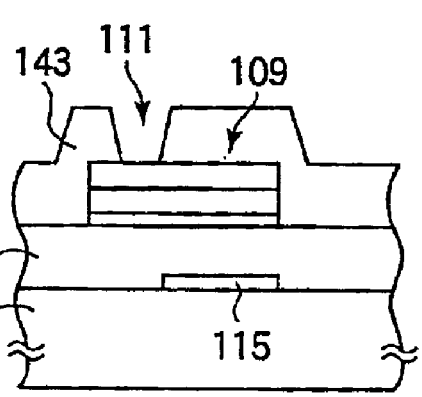

Next, as shown in FIGS. 8A and 8B, a protection film 143 made of, for example, a SiN film having a thickness of about 300 nm is formed by the plasma CVD method. Next, the protection film 143 is patterned by using a fourth mask to make holes in the protection film 143 on the source electrode 119 and the storage capacitor electrode 109, so that a contact hole 107 is formed on the source electrode 119 and a contact hole 111 is formed on the storage capacitor electrode 109.

Figure 9A:
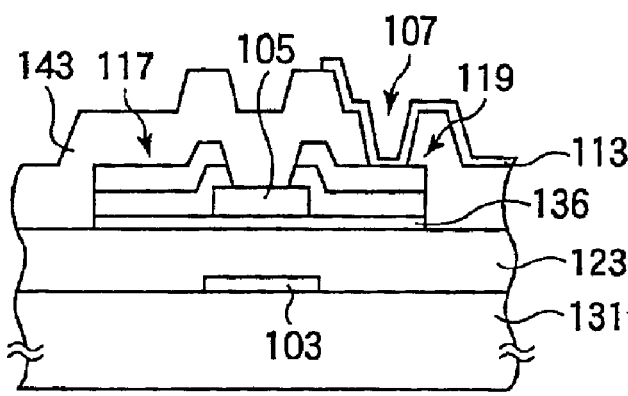
FIGS. 9A and 9B are process sectional views showing the manufacturing method for the liquid crystal display device according to the first embodiment of the present invention.
Figure 9B:
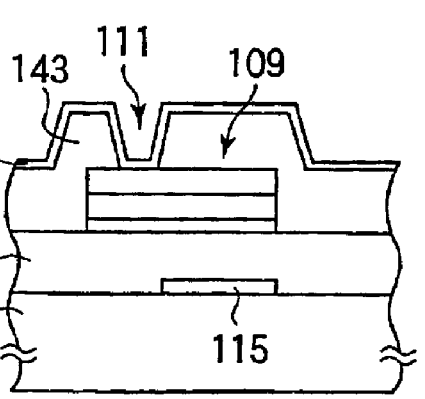

Next, as shown in FIGS. 9A and 9B, a film of pixel electrode formation material made of, for example, ITO and having a thickness of about 70 nm is formed on the whole surface of the transparent glass substrate 131. Next, the pixel electrode formation material is patterned by using a fifth mask to form a pixel electrode 113 of a predetermined shape as shown in FIG. 3A. The pixel electrode 113 is electrically connected to the source electrode 119 through the contact hole 107 and is electrically connected to the storage capacitor electrode 109 through the contact hole 111. A display panel of the liquid crystal display device according to this embodiment is completed through the above process.

Figure 10:
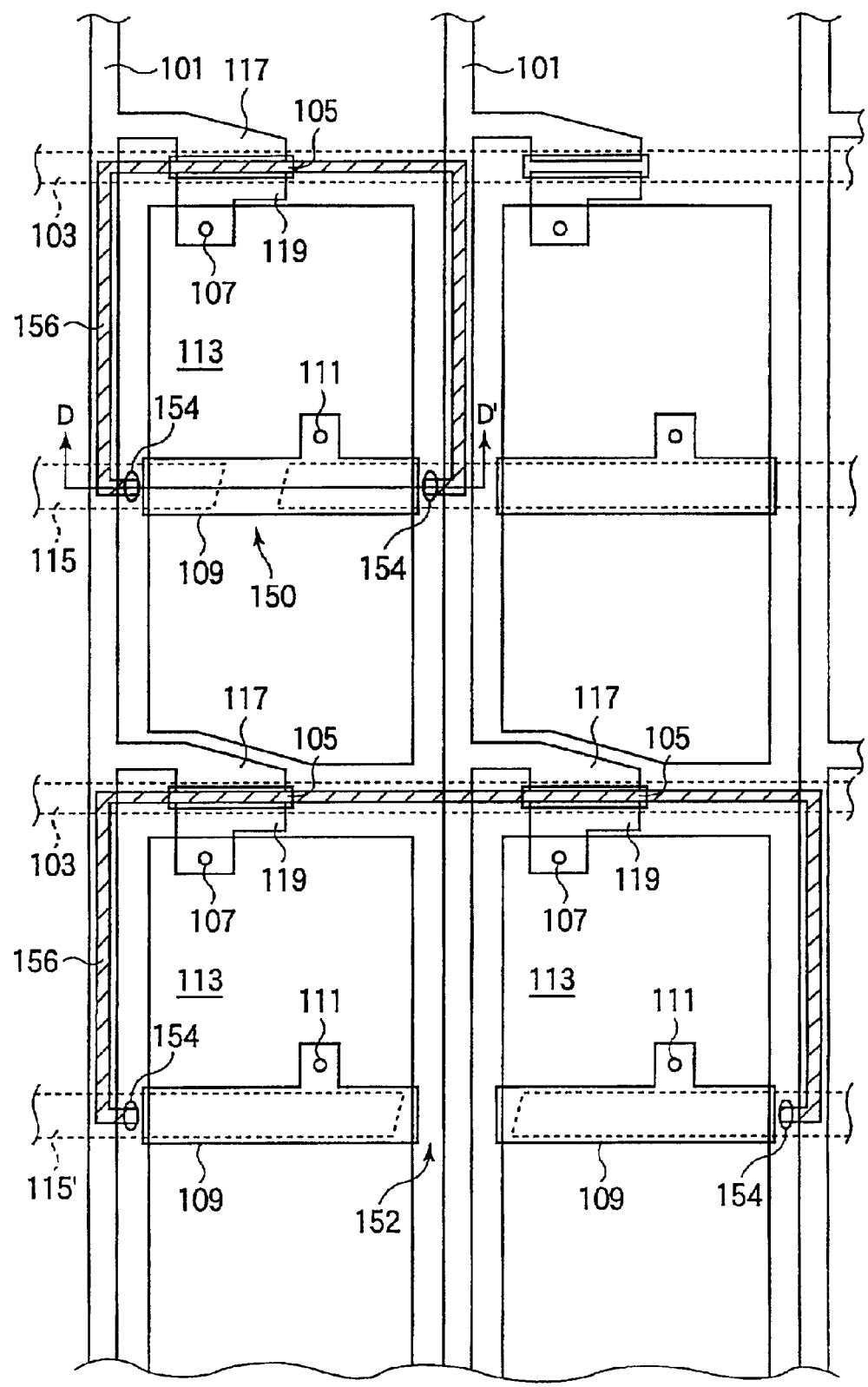
FIG. 10 is a plan view showing a defect repairing method f or the liquid crystal display device according to the first embodiment of the present invention.

Next, a defect repairing method for the liquid crystal display device according to this embodiment will be described with reference to FIGS. 10 to 12B. FIG. 10 is a plan view showing the defect repairing method for the liquid crystal display device according to this embodiment. Incidentally, structural elements having the same function and operation as structural elements shown in FIG. 3A are designated by the same characters and the explanation is omitted. Incidentally, it is assumed that a disconnection inspection of storage capacitor bus line 115 and 115' is carried out in advance, and as a result of the disconnection inspection, disconnection portions 150 and 152 of the storage capacitor bus lines 115 and 115' are found. First, disconnection repairing contact holes 154 for exposing the storage capacitor bus line 115 are formed at both end portions of a disconnection of the storage capacitor bus line 115 in which a disconnection defect occurs and in regions (between a storage capacitor electrode 109 and a drain bus line 101 in FIG. 10) where a pixel electrode 113 and the storage capacitor electrode 109 are not formed. Next, a disconnection repairing conductive film 156 is formed by using a laser CVD method. The disconnection repairing conductive film 156 is formed to detour on the drain bus line 101 and a gate bus line 103 around the pixel electrode 113 so that it does not short-circuit the pixel electrode 113. Both the end portions of the disconnection of the storage capacitor bus line 115 are electrically connected by a disconnection repair path constituted by the disconnection repairing conductive film 156, and the disconnection defect is repaired. Also in the storage capacitor bus line 115' in which a disconnection defect occurs in a wide range at the disconnection portion 152 extending over two pixels, it is repaired in the same manner.

Figure 11A:
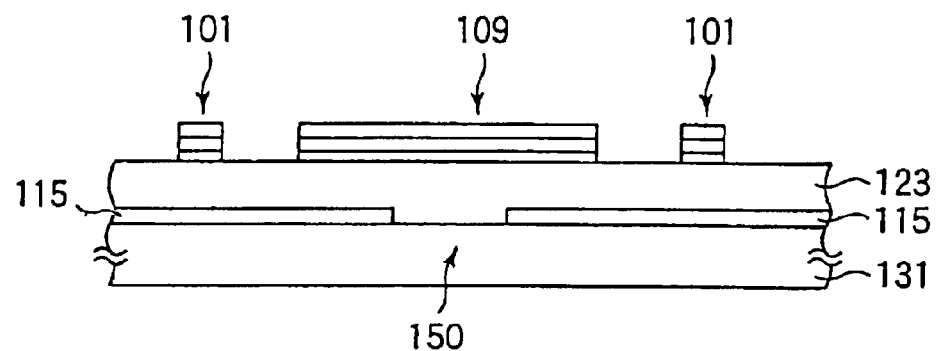
FIGS. 11A to 11C are process sectional view showing the defect repairing method for the liquid crystal display device according to the first embodiment of the present invention.
Figure 11B:
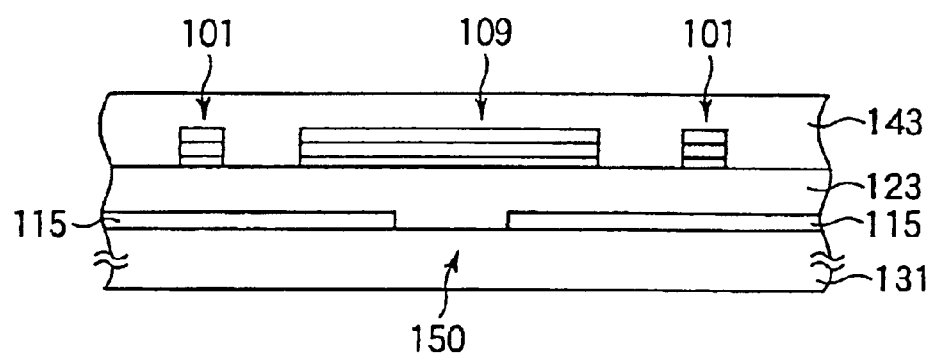
Figure 11C:
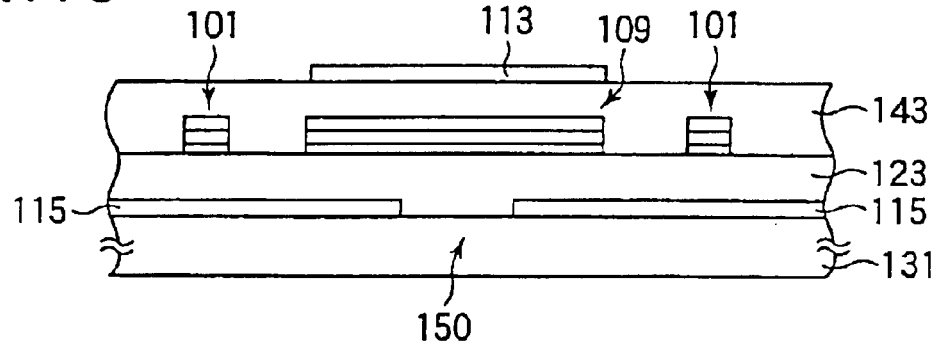

FIGS. 11A to 12B are process sectional views of the vicinity of the storage capacitor bus line 115 taken along line D–D' of FIG. 10, and show the defect repairing method for the liquid crystal display device according to this embodiment, together with a manufacturing process as its presupposition. First, the manufacturing process of the liquid crystal display device according to this embodiment will be described. By the same process as that shown in FIGS. 4A to 7B, the storage capacitor bus line 115, the storage capacitor electrode 109, and the drain bus line 101 are formed (FIG. 11A). Next, as shown in FIG. 11B, a protection film 143 made of, for example, a SiN film and having a thickness of about 300 nm is formed by a plasma CVD method. Next, as shown in FIG. 11C, the pixel electrode 113 made of, for example, ITO having a thickness of about 70 nm is formed on the protection film 143, and a display panel of the liquid crystal display device is completed.

Figure 12A:
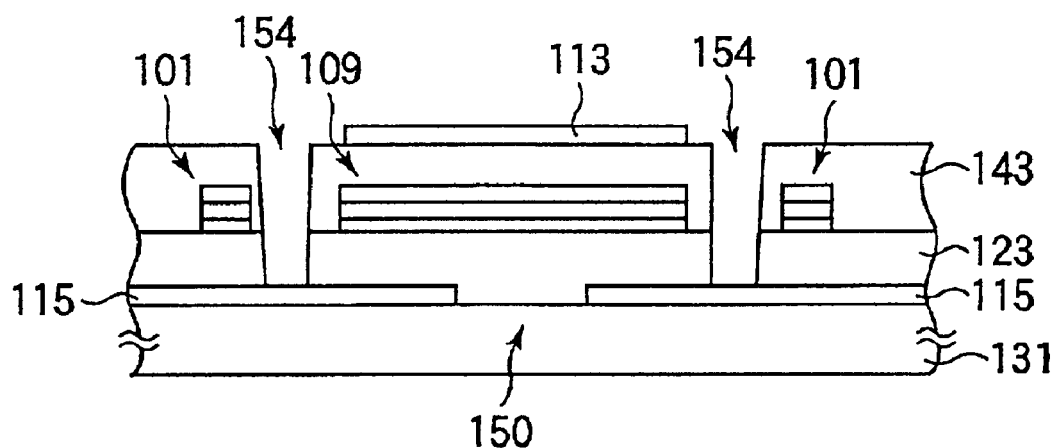
FIGS. 12A and 12B are process sectional view showing the defect repairing method for the liquid crystal display device according to the first embodiment of the present invention.

Next, the defect repairing process for the liquid crystal display device according to this embodiment will be described. First, as shown in FIG. 12A, the disconnection repairing contact holes 154 for exposing the storage capacitor bus line 115 are formed at both the end portions of the disconnection of the storage capacitor bus line 115 in which the disconnection defect occurs and in the regions where the pixel electrode 113 and the storage capacitor electrode 109 are not formed. The disconnection repairing contact holes 154 are formed by using a laser.

Figure 12B:
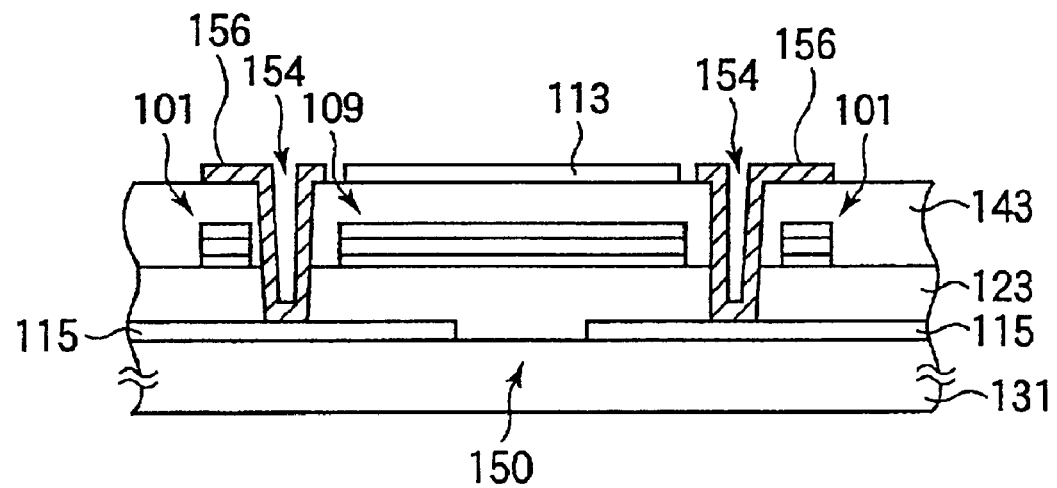

Next, as shown in FIG. 12B, the disconnection repairing conductive film 156 is formed above the storage capacitor electrode 109 without short-circuiting the pixel electrode 113 to connect the disconnection repairing contact holes 154 to each other. The disconnection repairing conductive film 156 is formed by using a laser CVD method and is formed on the protection film of the upper layer of the drain bus line 101 and the gate bus line 103 so that it detours around the pixel electrode 113. Both the end portions of the disconnection of the storage capacitor bus line 115 are electrically connected to each other by the disconnection repair path constituted by the disconnection repairing conductive film 156, and the disconnection defect is repaired.

According to this embodiment, when the disconnection defects occurring in the storage capacitor bus lines 115 and 115' are repaired, since the disconnection defect repairing conductive film 156 and the pixel electrodes 113 and 113' are not short-circuited, electrical insulation is kept between the storage capacitor bus lines 115 and 115' and the pixel electrodes 113 and 113'. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect.

Figure 13:
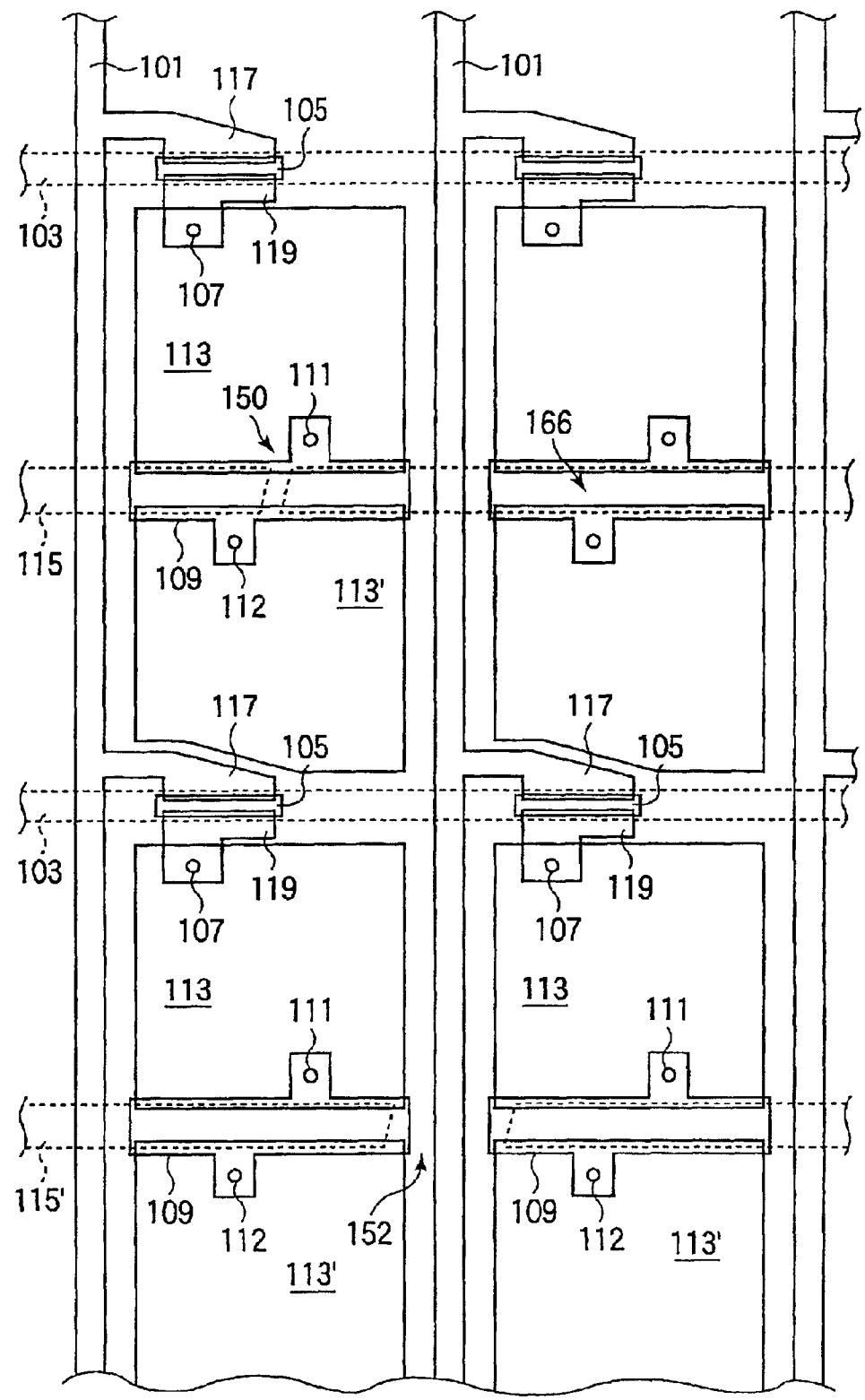
FIG. 13 is a plan view showing a structure of a liquid crystal display device according to a second embodiment of the present invention.

Next, a liquid crystal display device according to a second embodiment of the present invention and a defect repairing method for the same will be described with reference to FIGS. 13 to 15D. FIG. 13 is a plan view showing a structure of the liquid crystal display device according to this embodiment. Incidentally, structural elements having the same function and operation as structural elements shown in FIG. 3A are designated by the same characters and the explanation is omitted. In the liquid crystal display device shown in FIG. 13, a pixel electrode 113 is formed to be divided into two pixel electrodes 113 and 113' at both side of an electrically separated separation region 166 above a storage capacitor electrode 109. The storage capacitor electrode 109 includes two protruding regions as convex contact portions and is connected to the two pixel electrodes 113 and 113' through contact holes 111 and 112 formed in the respective protruding regions.

Besides, in the liquid crystal display device shown in FIG. 13, a disconnection defect at a disconnection portion 150 occurs in a storage capacitor bus line 115 in one pixel at the left upper portion in the drawing, and a disconnection defect at a disconnection portion 152 extending over two pixels occurs in a storage capacitor bus line 115' at the lower portion in the drawing.

Figure 14:
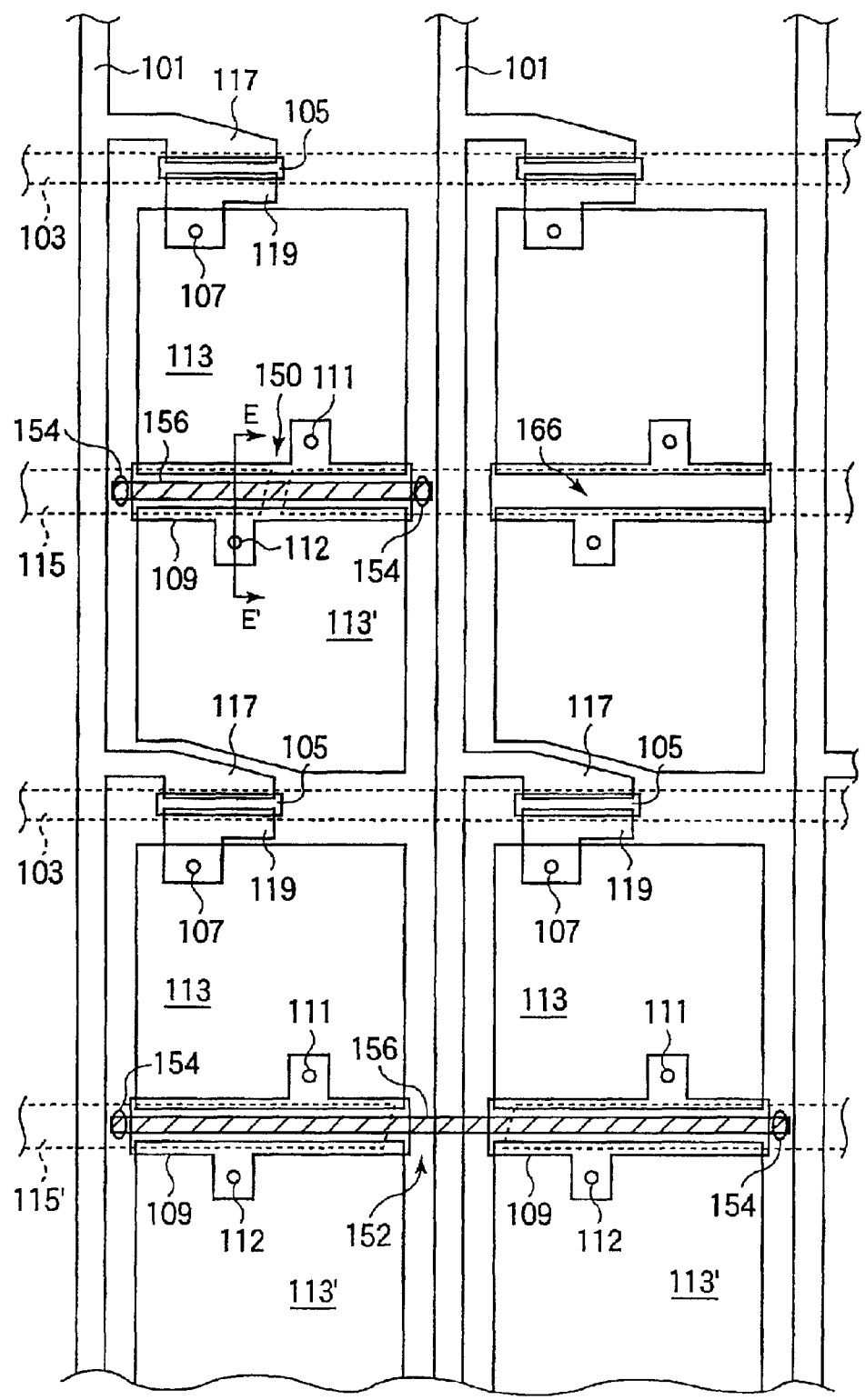
FIG. 14 is a plan view showing a defect repairing method for the liquid crystal display device according to the second embodiment of the present invention.

Next, the defect repairing method for the liquid crystal display device according to this embodiment will be described with reference to FIGS. 14 to 15D. FIG. 14 is a plan view showing the defect repairing method for the liquid crystal display device according to this embodiment of the present invention. Incidentally, structural elements having the same function and operation as structural elements shown in FIG. 3A are designated by the same characters and the explanation is omitted. It is assumed that a disconnection inspection of the storage capacitor bus lines 115 and 115' is carried out in advance, and as a result of the disconnection inspection, the disconnection portions 150 and 152 of the storage capacitor bus lines 115 and 115' are found. First, disconnection repairing contact holes 154 for exposing the storage capacitor bus line 115 are formed at both end portions of a disconnection of the storage capacitor bus line 115 in which a disconnection defect occurs at the disconnection portion 150 and in regions (between the storage capacitor electrode 109 and a drain bus line 101 in FIG. 14) where the pixel electrode 113 and the storage capacitor electrode 109 are not formed. Next, a disconnection repairing conductive film 156 is formed on the separation region 166 by using a laser CVD method without short-circuiting the pixel electrode 113. Here, the separation region 166 has a sufficient width to form the disconnection repairing conductive film 156. Both the end portions of the disconnection of the storage capacitor bus line 115 are electrically connected to each other by a disconnection repair path constituted by the disconnection repairing conductive film 156, and the disconnection defect is repaired. Also in the storage capacitor bus line 115' in which the disconnection defect occurs in a wide range at the disconnection portion 152 extending over two pixels, it is repaired in the same manner.

The defect repairing method for the liquid crystal display device according to this embodiment will be described more specifically with reference to FIGS. 15A to 15D. FIGS. 15A to 15D are process sectional views of the vicinity of the storage capacitor bus line 115 taken along line E–E' of FIG. 14, and show the defect repairing method for the liquid crystal display device according to this embodiment, together with a manufacturing process as its presupposition. Incidentally, structural elements having the same function and operation as structural elements shown in FIG. 9B and the like are designated by the same characters and the explanation is omitted.

Figure 15A:
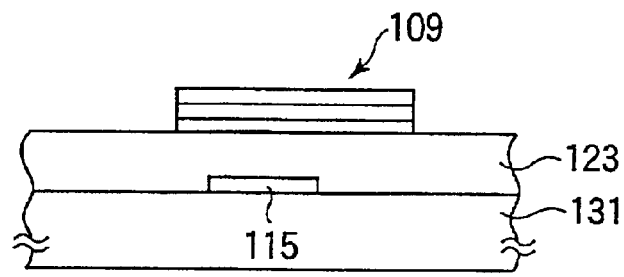
FIGS. 15A to 15D are process sectional view showing the defect repairing method for the liquid crystal display device according to the second embodiment of the present invention.
Figure 15B:
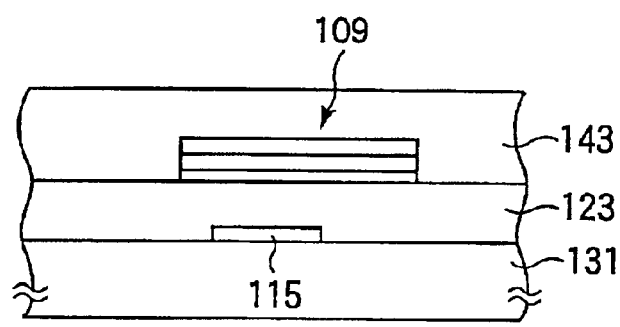
Figure 15C:
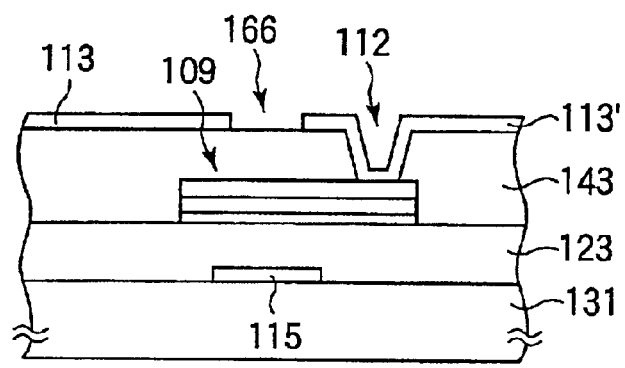

First, the manufacturing process of the liquid crystal display device according to this embodiment will be described. By substantially the same process as that shown in FIGS. 4A to 6B, the storage capacitor electrode 109 including the two up and down protruding regions as shown in FIG. 14 is formed (FIG. 15A). Next, as shown in FIG. 15B, a protection film 143 made of, for example, a SiN film and having a thickness of about 300 nm is formed by a plasma CVD method. Next, as shown in FIG. 15C, the protection film 143 is patterned to make a hole in the protection film 143 on the protruding region of the storage capacitor electrode 109, so that the contact hole 112 is formed. Next, a film of pixel electrode formation material made of, for example, ITO and having a thickness of about 70 nm is formed and is patterned to form the pixel electrodes 113 and 113' separated from each other by the separation region 166 above the storage capacitor electrode 109 as shown in FIG. 13. The pixel electrode 113 is electrically connected to the storage capacitor electrode 109 through the contact hole 111 (not shown in FIGS. 15A to 15D). The pixel electrode 113' is electrically connected to the storage capacitor electrode 109 through the contact hole 112. That is, although the pixel electrode 113 and the pixel electrode 113' are formed to be separated from each other by the separation region 166, they are electrically connected to each other through the storage capacitor electrode 109. The liquid crystal display device shown in FIG. 13 is completed through the above described process.

Next, the defect repairing method for the liquid crystal display device according to this embodiment will be described. First, the disconnection repairing contact holes 154 (not shown in FIGS. 15A to 15D) for exposing the storage capacitor bus line 115 are formed at both the end portions of the disconnection of the storage capacitor bus line 115 in which the disconnection defect occurs and in the regions where the pixel electrodes 113 and 113' and the storage capacitor electrode 109 are not formed. The disconnection repairing contact holes 154 are formed by using a laser. Laser light used for formation of the disconnection repairing contact holes 154 is the third harmonic (355 nm) of a YAG pulse laser or the fourth harmonic (266 nm).

Figure 15D:
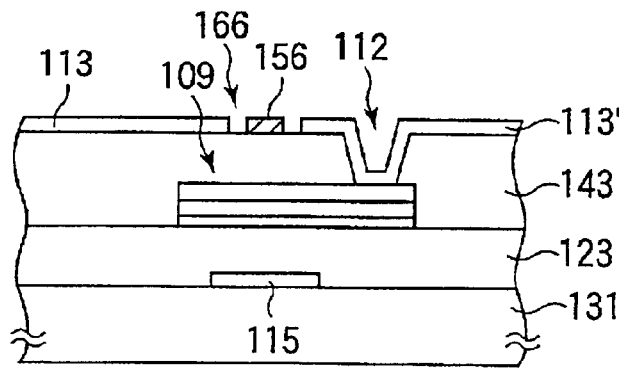

Next, as shown in FIG. 15D, the disconnection repairing conductive film 156 is formed on the separation region 166 without short-circuiting the pixel electrodes 113 and 113' to connect the disconnection repairing contact holes 154 to each other. The disconnection repairing conductive film 156 is formed by using a laser CVD method. Both the end portions of the disconnection of the storage capacitor bus line 115 are electrically connected to each other by the disconnection repair path constituted by the disconnection repairing conductive film 156, and the disconnection defect is repaired.

The film formation of the disconnection repairing conductive film 156 by the laser CVD method is made such that while argon (Ar) gas containing tungsten (W) organic metal, molybdenum (Mo) organic metal, or chromium (Cr) organic metal is made to flow, the concentration of the organic metal gas (film formation gas), laser power, scanning speed, and the number of scans are adjusted, and continuous-wave laser light of YAG 355 mm is irradiated, so that the film is deposited.

Specific film formation conditions are as follows: The film formation gas is metal carbonyl $\{W(CO)_6, Cr(CO)_6\}$. The laser power is 0.2 to 0.4 as an attenuator value. The scanning speed is 3.0 $\mu$m/sec. The number of scans is one reciprocation. The flow rate of carrier gas (Ar) is 90 cc/min. When film formation is made under the conditions, there is obtained a film of W having a thickness of 400 to 600 nm and a specific resistance of 100 to 150 $\mu\Omega$·cm. Incidentally, the specific resistance of W simple substance is 5.65 $\mu\Omega$·cm.

Although the diameter of the contact hole depends on the laser conditions, the diameter having a level of 2 to 5 $\mu$m is used. A metal wiring portion formed by the laser CVD method has a minimum drawing line width of 5 $\mu$m, a film thickness of 0.2 $\mu$m, and a specific resistance of 50 $\mu\Omega$·cm or less.

According to this embodiment, when the disconnection defects occurring in the storage capacitor bus lines 115 and 115' are repaired, since the disconnection repairing conductive film and the pixel electrodes 113 and 113' are not short-circuited, electrical insulation is kept between the storage capacitor bus lines 115 and 115' and the pixel electrodes 113 and 113'. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect. Further, since the disconnection repair path does not detour, the laser CVD method can be easily and accurately used.

Figure 16:
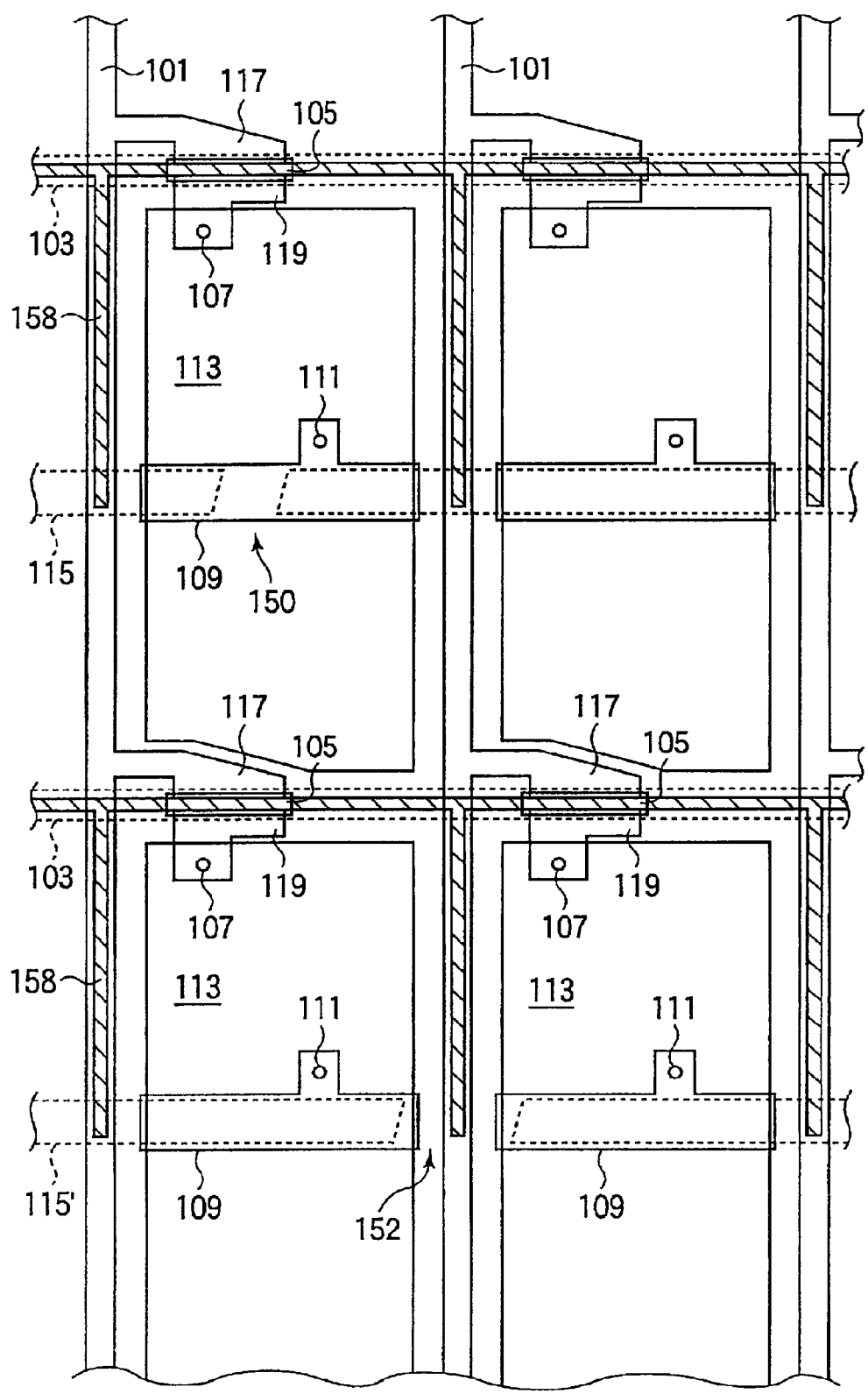
FIG. 16 is a plan view showing a structure of a liquid crystal display device according to a third embodiment of the present invention.

Next, a liquid crystal display device according to a third embodiment and a defect repairing method for the same will be described with reference to FIGS. 16 to 19B. FIG. 16 is a plan view showing a structure of the liquid crystal display device according to this embodiment. Incidentally, structural elements having the same function and operation as structural elements shown in FIG. 3A are designated by the same characters and the explanation is omitted. The liquid crystal display device shown in FIG. 16 is characterized by including a disconnection repairing conductive film 158 formed around a pixel electrode 113 and to be electrically separated from the pixel electrode 113. The disconnection repairing conductive film 158 is made of formation material of the pixel electrode 113 and is formed at the same time as the pixel electrode 113. Besides, both wiring ends of the disconnection repairing conductive film 158 are positioned on a storage capacitor bus line 115 or 115'. Further, the disconnection repairing conductive film 158 is formed on a gate bus line 103 and a drain bus line 101 at the upper half side of the periphery of the pixel electrode 113 in the drawing, and is formed to connect the adjacent pixels along the gate bus line 103.

Figure 17:
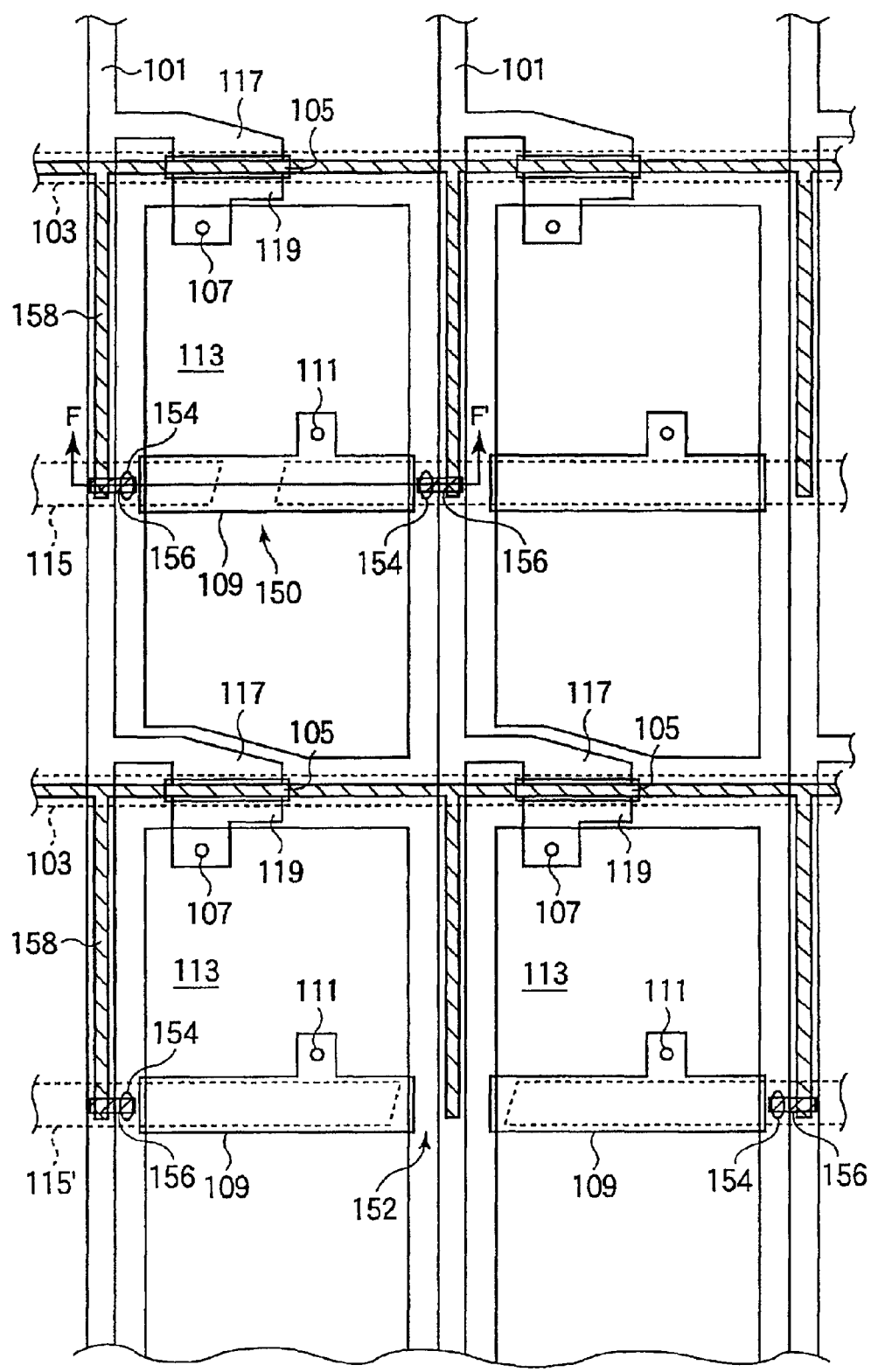
FIG. 17 is a plan view showing a defect repairing method for the liquid crystal display device according to the third embodiment of the present invention.

Next, the defect repairing method for the liquid crystal display device according to this embodiment will be described with reference to FIGS. 17 to 19B. FIG. 17 is a plan view showing the defect repairing method for the liquid crystal display device according to this embodiment. Incidentally, structural elements having the same function and operation as structural elements shown in FIG. 3A are designated by the same characters and the explanation is omitted. It is assumed that a disconnection inspection of storage capacitor bus lines 115 and 115' is carried out in advance, and as a result of the disconnection inspection, disconnection portions 150 and 152 of the storage capacitor bus lines 115 and 115' are found. As shown in FIG. 17, first, disconnection repairing contact holes 154 for exposing the storage capacitor bus line 115 are formed at both end portions of a disconnection of the storage capacitor bus line 115 in which a disconnection defect occurs at the disconnection portion 150 and in regions (between a storage capacitor electrode 109 and a drain bus line 101 in FIG. 17) where the pixel electrode 113 and the storage capacitor electrode 109 are not formed. Next, disconnection repairing conductive films 156 to be connected with the disconnection repairing conductive film 158 are formed by using a laser CVD method to connect the disconnection repairing conductive film 158 and the contact holes 154. Both the end portions of the disconnection of the storage capacitor bus line 115 are electrically connected to each other by a disconnection repair path which is constituted by the disconnection repairing conductive films 156 and the disconnection repairing conductive film 158 and detours around the pixel electrode 113, and the disconnection defect is repaired. Also in the storage capacitor bus line 115' in which the disconnection defect occurs in a wide range at the disconnection portion 152 extending over two pixels, it is repaired in the same manner.

Figure 18A:
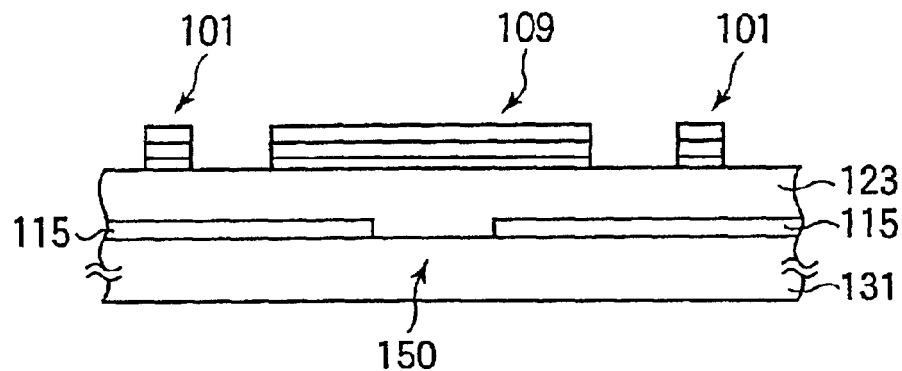
FIGS. 18A to 18C are process sectional views showing the defect repairing method for the liquid crystal display device according to the third embodiment of the present invention.
Figure 18B:
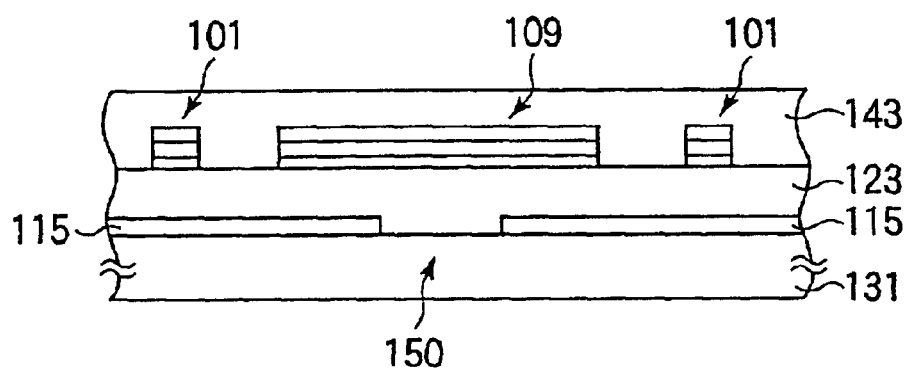
Figure 18C:
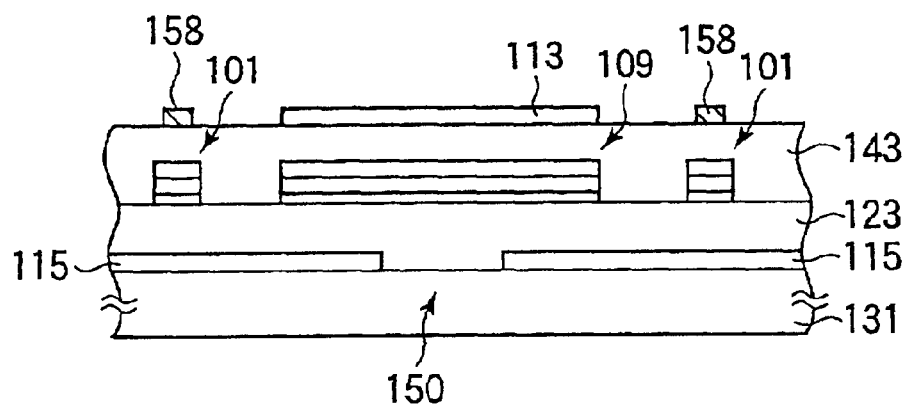

The defect repairing method for the liquid crystal display device according to this embodiment will be described more specifically with reference to FIGS. 18A to 19B. FIGS. 18A to 19B are process sectional views of the vicinity of the storage capacitor bus line 115 taken along line F–F' of FIG. 17, and show the defect repairing method for the liquid crystal display device according to this embodiment, together with a manufacturing process as its presupposition. Incidentally, structural elements having the same function and operation as structural elements shown in FIG. 9B and the like are designated by the same characters and the explanation is omitted. First, the manufacturing process of the liquid crystal display device according to this embodiment will be described. By the same process as that shown in FIGS. 4A to 7B, the storage capacitor bus line 115, the storage capacitor electrode 109, and the drain bus line 101 are formed (FIG. 18A). Next, as shown in FIG. 18B, a protection film 143 made of, for example, a SiN film and having a thickness of about 300 nm is formed by a plasma CVD method. Next, as shown in FIG. 18C, a film of, for example, ITO having a thickness of about 70 nm is formed and is patterned to form the pixel electrode 113 and the defect repairing conductive film 158 on the protection film 143.

Figure 19A:
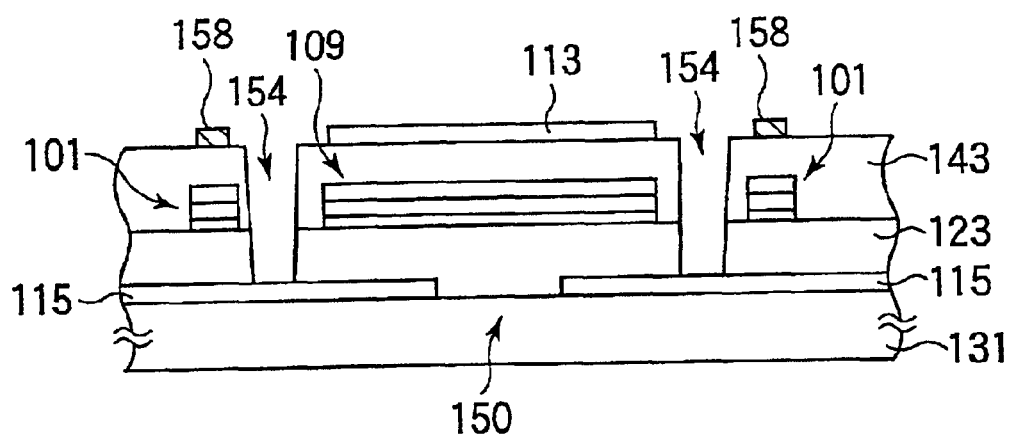
FIGS. 19A and 19B are process sectional views showing the defect repairing method for the liquid crystal display device according to the third embodiment of the present invention.

Next, the defect repairing method for the liquid crystal display device according to this embodiment will be described. First, as shown in FIG. 19A, the disconnection repairing contact holes 154 for exposing the storage capacitor bus line 115 are formed at both the end portions of the disconnection of the storage capacitor bus line 115 in which the disconnection defect occurs and in the regions where the pixel electrode 113 and the storage capacitor electrode 109 are not formed. The disconnection repairing contact holes 154 are formed by using a laser.

Figure 19B:
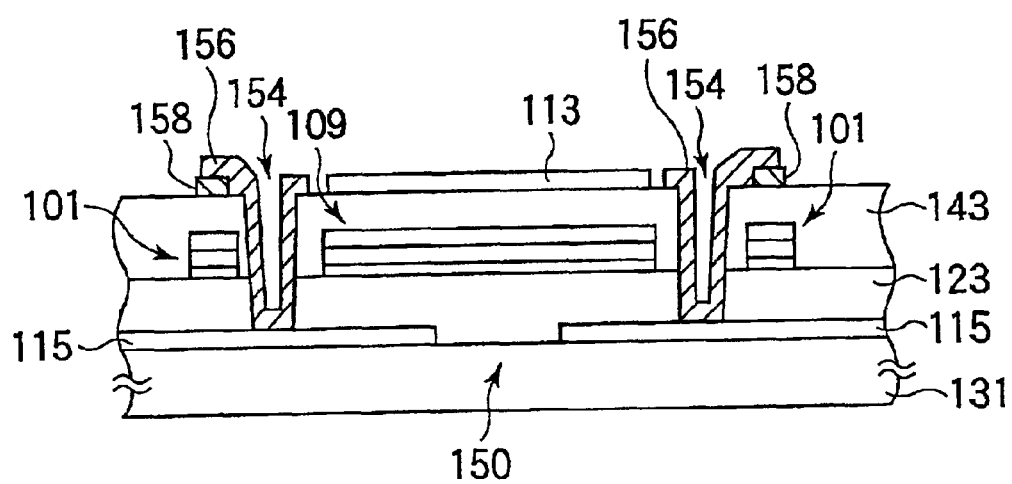

Next, as shown in FIG. 19B, the disconnection repairing conductive films 156 to be connected with the disconnection repairing film 158 are formed above the storage capacitor electrode 109 without short-circuiting the pixel electrode 113 to connect the disconnection repairing contact holes 154 and the disconnection repairing conductive film 158. The disconnection repairing conductive films 156 are formed by using a laser CVD method. Both the end portions of the disconnection of the storage capacitor bus line 115 are electrically connected to each other by the disconnection repair path constituted by the disconnection repairing conductive films 156 and the disconnection repairing conductive film 158, and the disconnection defect is repaired.

According to this embodiment, when the disconnection defects occurring in the storage capacitor bus lines 115 and 115' are repaired, since the disconnection repairing conductive films 156 and the pixel electrode 113 are not short-circuited, electrical insulation is kept between the storage capacitor bus lines 115 and 115' and the pixel electrode 113. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect. Further, in the disconnection repair path, since the disconnection repairing conductive film 158 detouring around the pixel electrode 113 is formed in advance, the distance of the disconnection repairing conductive film 156 formed by using the laser CVD method is short, and a time required for defect repairing can be shortened. Besides, since the disconnection repairing conductive film 158 is made of the formation material of the pixel electrode 113 and is formed at the same time as the pixel electrode 113, the manufacturing process is not increased.

Figure 20:
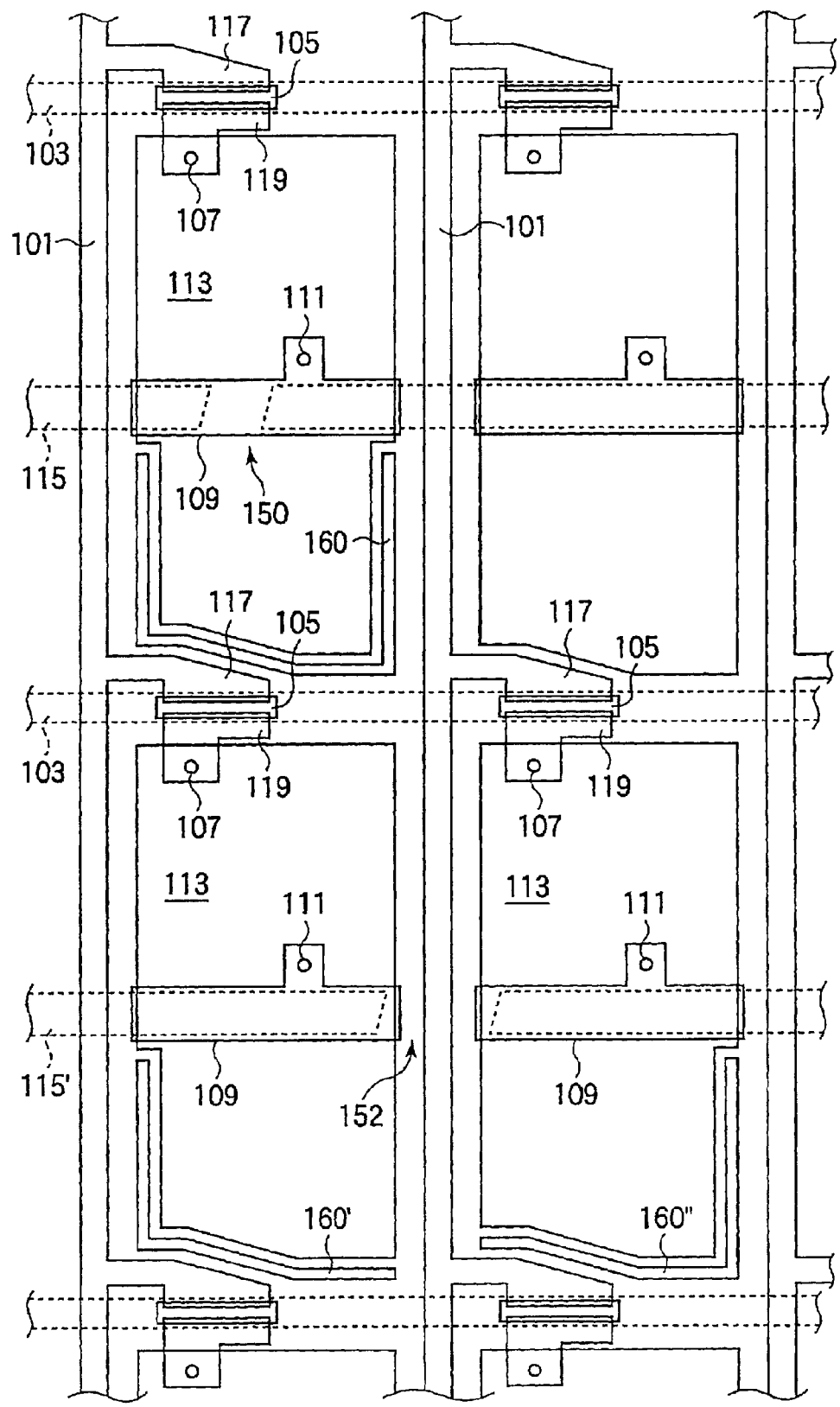
FIG. 20 is a plan view showing a defect repairing method for a liquid crystal display device according to a fourth embodiment of the present invention.
Figure 21:
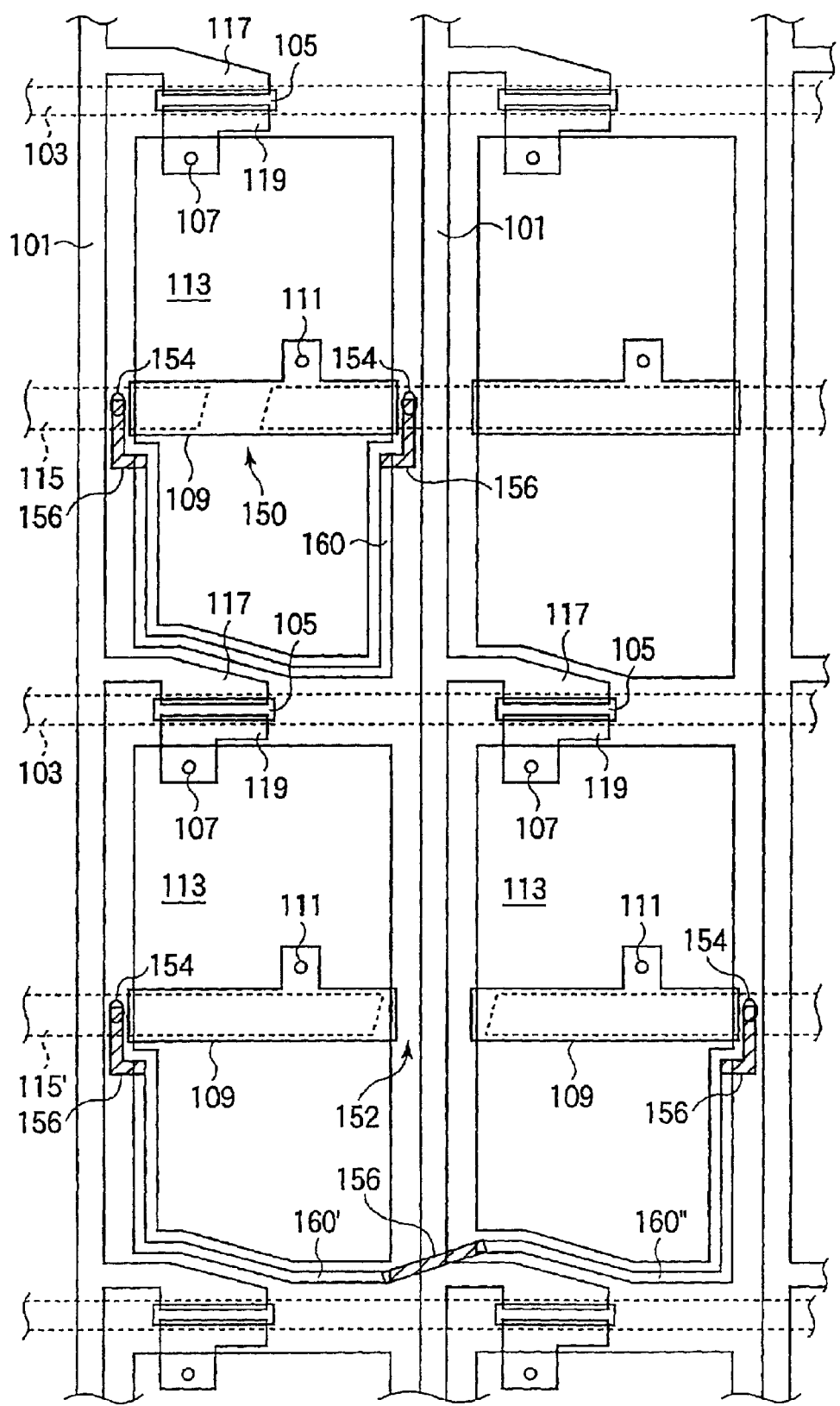
FIG. 21 is a plan view showing the defect repairing method for the liquid crystal display device according to the fourth embodiment of the present invention.

Next, a defect repairing method for a liquid crystal display device according to a fourth embodiment of the present invention will be described with reference to FIGS. 20 and 21. FIGS. 20 and 21 are plan views showing the defect repairing method for the liquid crystal display device according to this embodiment. Incidentally, structural elements having the same function and operation as structural elements shown in FIG. 3A are designated by the same characters and the explanation is omitted. It is assumed that a disconnection inspection of storage capacitor bus lines 115 and 115' is carried out in advance, and as a result of the disconnection inspection, disconnection portions 150 and 152 of the storage capacitor bus lines 115 and 115' are found. As shown in FIG. 20, first, a part of an outer periphery of a pixel electrode 113 formed in a pixel region including the disconnection portion 150 is separated by a laser and is isolated, and a disconnection repairing conductive film 160 is formed by the isolated region. Next, as shown in FIG. 21, disconnection repairing contact holes 154 for exposing the storage capacitor bus line 115 are formed at both end portions of a disconnection of the storage capacitor bus line 115 in which a disconnection defect occurs and in regions (between a storage capacitor electrode 109 and a drain bus line 101 in FIG. 21) where the pixel electrode 113 and the storage capacitor electrode 109 are not formed. Next, disconnection repairing conductive films 156 to be connected with the disconnection repairing conductive film 160 are formed by using a laser CVD method to connect the disconnection repairing contact holes 154 and the disconnection repairing conductive film 160. By a disconnection repair path constituted by the disconnection repairing conductive films 156 and the disconnection repairing conductive film 160 and detouring around the pixel electrode 113, both the end portions of the disconnection of the storage capacitor bus line 115 are electrically connected to each other, and the disconnection defect is repaired.

With respect to the storage capacitor bus line 115' in which the disconnection defect occurs in a wide range at the disconnection portion 152 extending over two pixels, part of outer peripheries of two pixel electrodes 113 formed in two pixel regions including the disconnection portion 152 are respectively separated by a laser to form disconnection repairing conductive films 160' and 160". Next, as shown in FIG. 21, disconnection repairing contact holes 154 for exposing the storage capacitor bus line 115' are formed at both end portions of a disconnection of the storage capacitor bus line 115' in which a disconnection defect occurs and in regions where the pixel electrode 113 and the storage capacitor electrode 109 are not formed. Next, disconnection repairing conductive films 156 are formed by using a laser CVD method, and the disconnection repairing contact hole 154 is connected to the disconnection repairing conductive film 160'. Subsequently, the disconnection repairing conductive film 160' is connected to the disconnection repairing conductive film 160", and the disconnection repairing conductive film 160" is connected to the disconnection repairing contact hole 154. By a disconnection repair path which is constituted by the disconnection repairing conductive films 156 and the disconnection repairing conductive film 160 and detours around the pixel electrode 113, both the end portions of the disconnection of the storage capacitor bus line 115 are electrically connected to each other, and the disconnection is repaired.

According to this embodiment, when the disconnection defects occurring in the storage capacitor bus lines 115 and 115' are repaired, since the disconnection repairing conductive films 156 and the pixel electrode 113 are not short-circuited, electrical insulation is kept between the storage capacitor bus lines 115 and 115' and the pixel electrode 113. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect. Further, in the disconnection repair path, since the disconnection repairing conductive film 160 detouring around the pixel electrode 113 is formed by separating the part of the outer periphery of the pixel electrode 113, the distances of the disconnection repairing conductive films 156 formed by the laser CVD method are short, and a time required for defect repairing can be shortened. Incidentally, since the part of the outer periphery of the pixel electrode 113 is only separated, the pixel does not become a defect.

Figure 22:
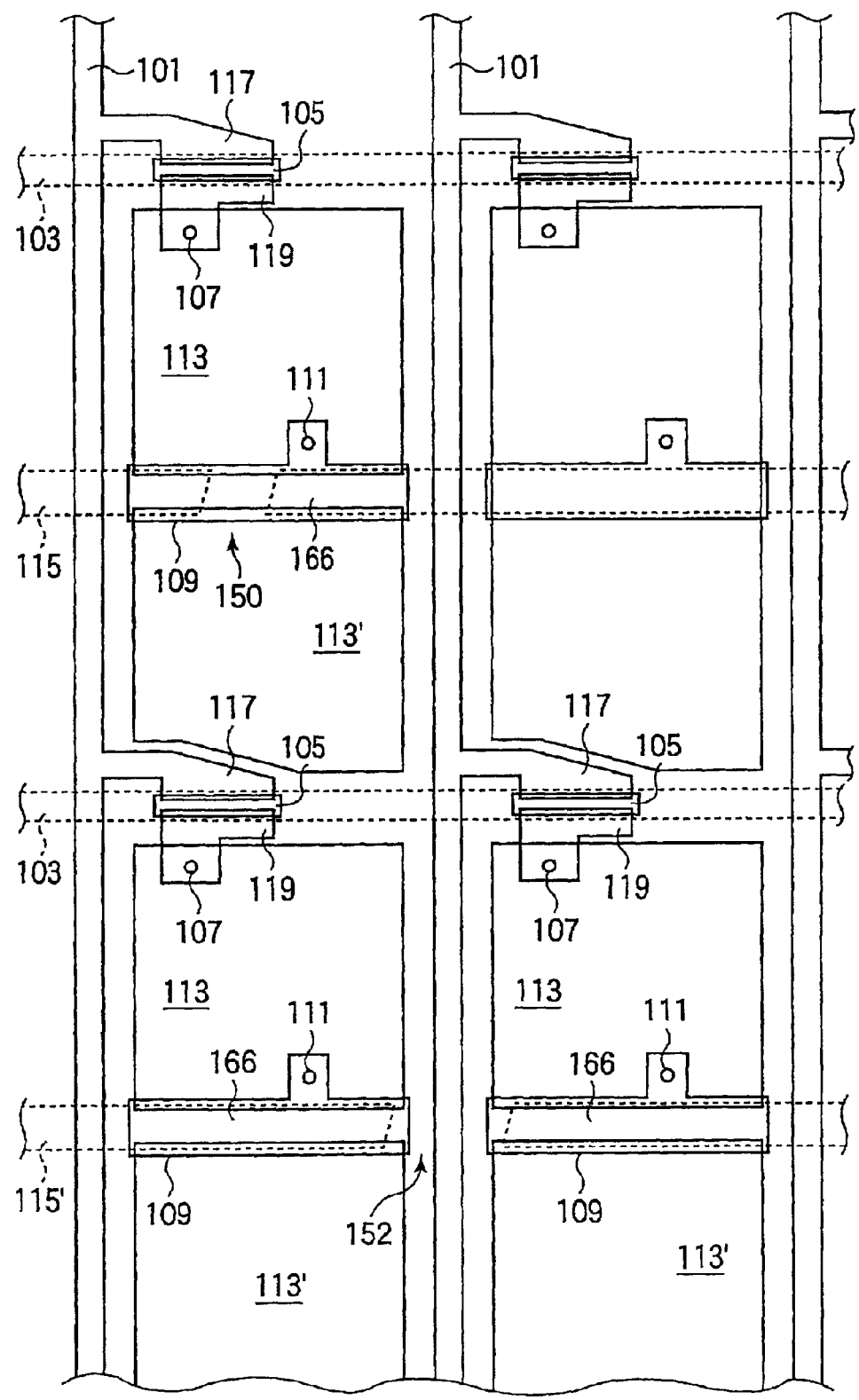
FIG. 22 is a plan view showing a defect repairing method for a liquid crystal display device according to a fifth embodiment of the present invention.
Figure 23:
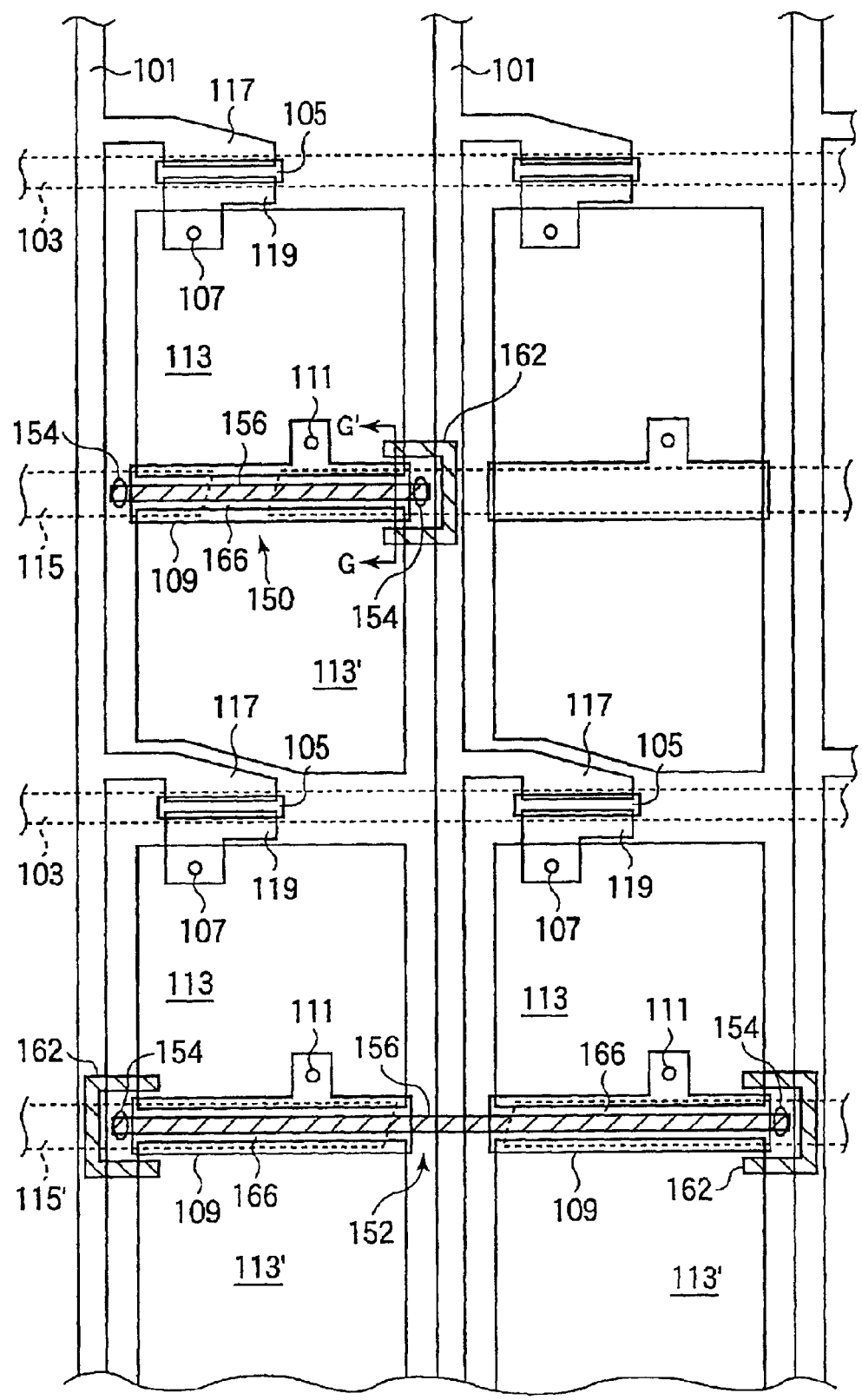
FIG. 23 is a plan view showing the defect repairing method for the liquid crystal display device according to the fifth embodiment of the present invention.

Next, a defect repairing method for a liquid crystal display device according to a fifth embodiment of the present invention will be described with reference to FIGS. 22 to 24D. FIGS. 22 and 23 are plan views showing the defect repairing method for the liquid crystal display device according to this embodiment. Incidentally, structural elements having the same function and operation as structural elements shown in FIG. 3A are designated by the same characters and the explanation is omitted. It is assumed that a disconnection inspection of storage capacitor bus lines 115 and 115' is carried out in advance, and as a result of the disconnection inspection, disconnection portions 150 and 152 of the storage capacitor bus lines 115 and 115' are found. As shown in FIG. 22, first, a pixel electrode 113 over a storage capacitor electrode 109 in a pixel region including the disconnection portion 150 is removed and separated by using a laser to form a separation region 166. The pixel electrode 113 is divided into two pixel electrodes 113 and 113' at both sides of the separation region 166. Next, as shown in FIG. 23, disconnection repairing contact holes 154 for exposing the storage capacitor bus line 115 are formed at both end portions of a disconnection of the storage capacitor bus line 115 in which a disconnection defect occurs and in regions (between a storage capacitor electrode 109 and a drain bus line 101 in FIG. 23) where the pixel electrodes 113 and 113' and the storage capacitor electrode 109 are not formed. The disconnection repairing contact holes 154 are formed by using a laser.

Next, a disconnection repairing conductive film 156 is formed on the separation region 166 without short-circuiting the pixel electrodes 113 and 113' to connect the disconnection repairing contact holes 154 to each other. The disconnection repairing conductive film 156 is formed by using a laser CVD method. By a disconnection repair path constituted by the disconnection repairing conductive film 156, both the end portions of the disconnection of the storage capacitor bus line 115 are electrically connected to each other, and the disconnection defect is repaired. Next, a pixel electrode connection conductive film 162 for connecting the divided pixel electrodes 113 and 113' is formed. The pixel electrode connection conductive film 162 is formed by using the laser CVD method, and is formed to detour around the disconnection repairing conductive film 156 so that the disconnection repairing conductive film 156 is not short-circuited. Also in the storage capacitor bus line 115' in which the disconnection defect occurs in a wide range at the disconnection portion 152 extending over two pixels, it is repaired in the same manner.

Figure 24A:
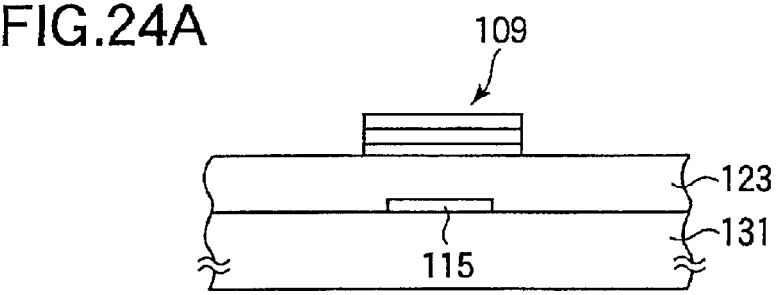
FIGS. 24A to 24D are process sectional views showing the defect repairing method for the liquid crystal display device according to the fifth embodiment of the present invention.
Figure 24B:
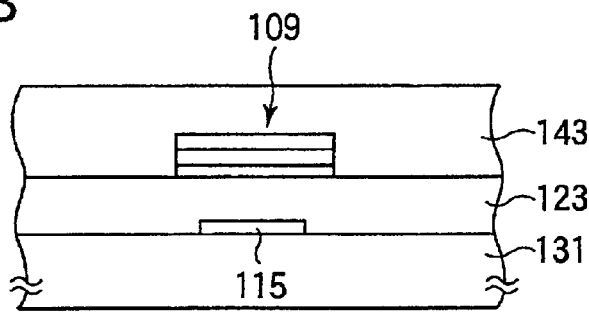

The defect repairing method for the liquid crystal display device according to this embodiment will be described more specifically with reference to FIGS. 24A to 24D. FIGS. 24A to 24D are process sectional views of the vicinity of the storage capacitor bus line 115 taken along line G–G' of FIG. 23, and show the defect repairing method for the liquid crystal display device according to this embodiment, together with a manufacturing process as its presupposition. Incidentally, structural elements having the same function and operation as structural elements shown in FIG. 9B and the like are designated by the same characters and the explanation is omitted. First, the manufacturing process of the liquid crystal display device according to this embodiment will be described. By substantially the same process as that shown in FIGS. 4A to 7B, the storage capacitor bus line 115, the storage capacitor electrode 109, and the drain bus line 101 are formed (FIG. 24A). Next, as shown in FIG. 24B, a protection film 143 made of, for example, a SiN film and having a thickness of about 300 nm is formed by a plasma CVD method. Next, a film of, for example, ITO having a thickness of about 70 nm is formed and is patterned to form the pixel electrode 113 on the protection film 143.

Figure 24C:
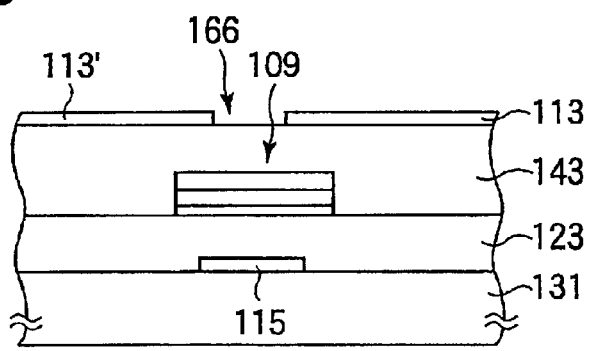
Figure 24D:
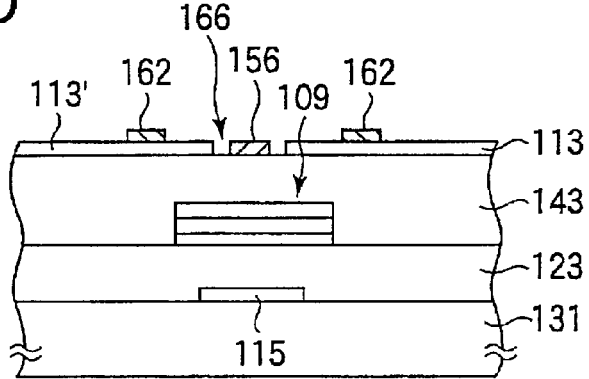

Next, the defect repairing method for the liquid crystal display device according to this embodiment will be described. First, as shown in FIG. 24C, the pixel electrode 113 formed in the pixel region including the disconnection portion 150 is separated at a place above the storage capacitor electrode 109 to form the separation region 166. The pixel electrode 113 is divided into two pixel electrodes 113 and 113' at both sides of the separation region 166. Next, the disconnection repairing contact holes 154 (not shown in FIGS. 24A to 24D) for exposing the storage capacitor bus line 115 are formed at both the end portions of the disconnection of the storage capacitor bus line 115 in which the disconnection defect occurs and in the regions where the pixel electrodes 113 and 113' and the storage capacitor electrode 109 are not formed. Next, as shown in FIG. 24D, the disconnection repairing conductive film 156 is formed at the place above the storage capacitor electrode 109, in which the pixel electrode 113 is removed, without short-circuiting the pixel electrodes 113 and 113'. The disconnection repairing conductive film 156 for connecting both the end portions of the disconnection of the storage capacitor bus line 115 is formed by using the laser CVD method. Next, the pixel electrode connection conductive film 162 for electrically connecting the divided pixel electrodes 113 and 113' is formed. The pixel electrode connection conductive film 162 is formed by using the laser CVD method.

According to this embodiment, when the disconnection defects occurring in the storage capacitor bus lines 115 and 115' are repaired, since the disconnection repairing conductive film 156 and the pixel electrodes 113 and 113' are not short-circuited, electrical insulation is kept between the storage capacitor bus lines 115 and 115' and the pixel electrodes 113 and 113'. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect. Incidentally, although the pixel electrodes 113 and 113' are separated, since they are connected by the pixel electrode connection conductive film 162, the pixels do not become defects.

Figure 25:
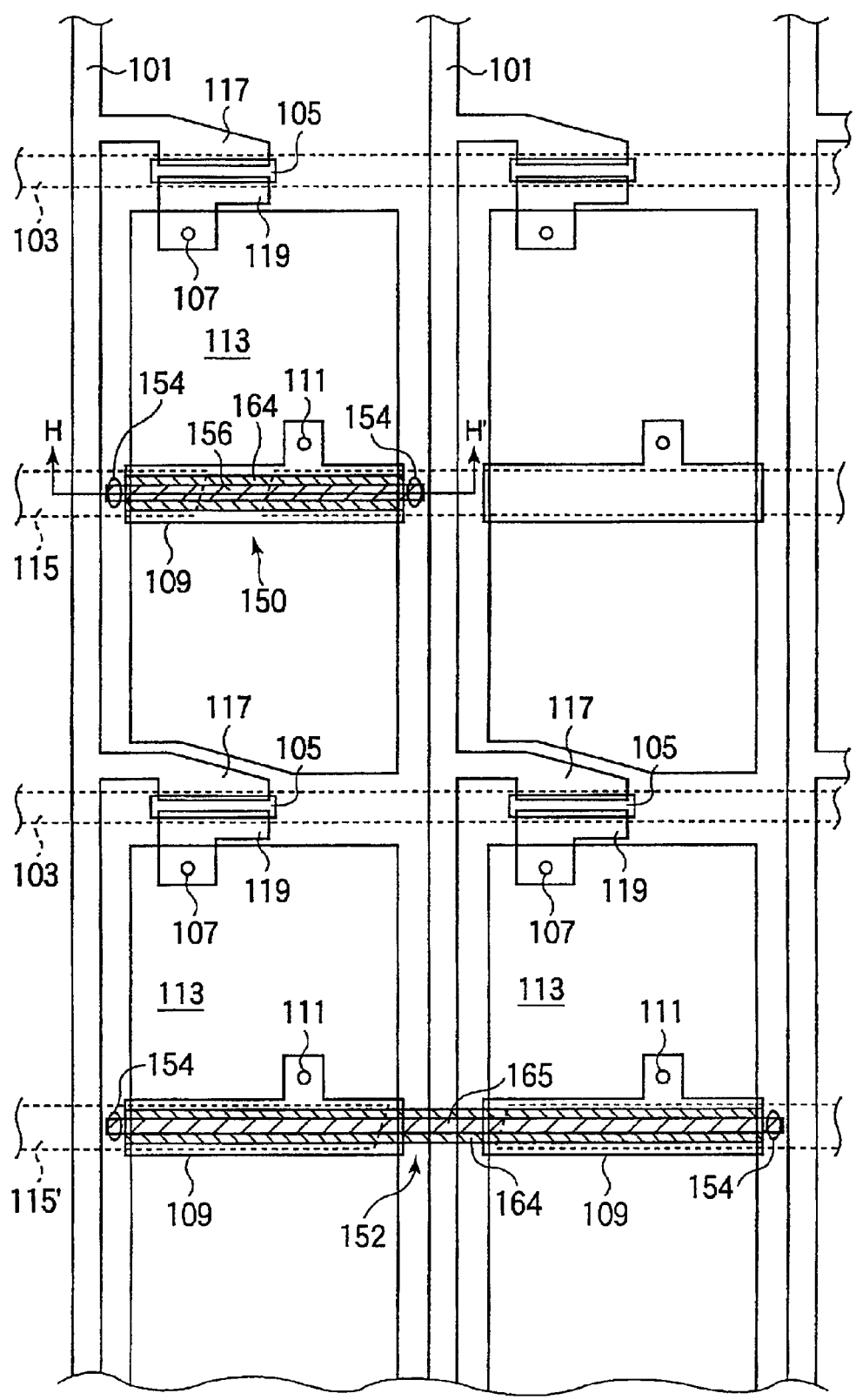
FIG. 25 is a plan view showing a defect repairing method for a liquid crystal display device according to a sixth embodiment of the present invention.

Next, a defect repairing method for a liquid crystal display device according to a sixth embodiment of the present invention will be described with reference to FIGS. 25 to 27B. FIG. 25 is a plan view showing the defect repairing method for the liquid crystal display device according to this embodiment. Incidentally, structural elements having the same function and operation as structural elements shown in FIG. 3A are designated by the same characters and the explanation is omitted. It is assumed that a disconnection inspection of storage capacitor bus line 115 and 115' is carried out in advance, and as a result of the disconnection inspection, disconnection portions 150 and 152 of the storage capacitor bus lines 115 and 115' are found. As shown in FIG. 25, first, a disconnection repairing insulating film 164 is formed above a storage capacitor electrode 109 formed in a pixel region including the disconnection portion 150 and on a pixel electrode 113. The disconnection repairing insulating film 164 is formed by using a laser CVD method.

Next, disconnection repairing contact holes 154 for exposing the storage capacitor bus line 115 are formed at both end portions of a disconnection of the storage capacitor bus line 115 in which a disconnection defect occurs and in regions (between the storage capacitor electrode 109 and a drain bus line 101 in FIG. 25) where the pixel electrode 113 and the storage capacitor electrode 109 are not formed. The disconnection repairing contact holes 154 are formed by using a laser.

Next, a disconnection repairing conductive film 156 is formed on the disconnection repairing insulating film 164 without short-circuiting the pixel electrode 113 to connect the disconnection repairing contact holes 154 to each other. The disconnection repairing conductive film 156 for connecting both the end portions of the disconnection of the storage capacitor bus line 115 is formed by using the laser CVD method. By a disconnection repair path constituted by the disconnection repairing conductive film 156, both the end portions of the disconnection of the storage capacitor bus line 115 are electrically connected to each other, and the disconnection is repaired. Also in the storage capacitor bus line 115' in which a disconnection defect occurs in a wide range at the disconnection portion 152 extending over two pixels, it is repaired in the same manner.

Figure 26A:
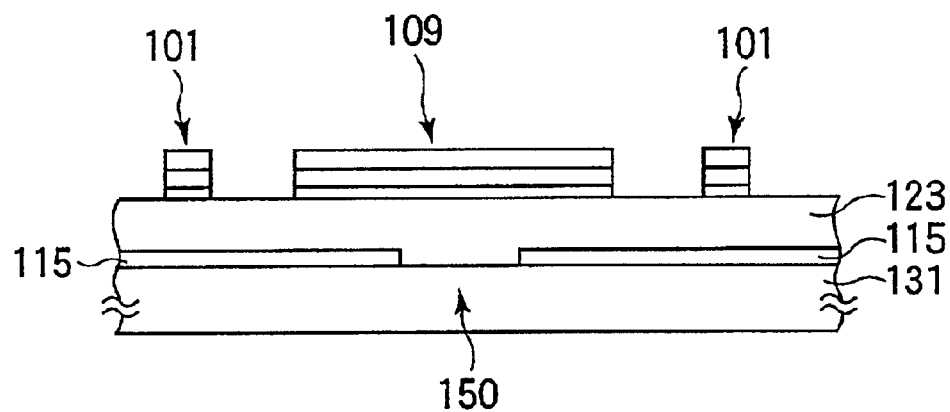
FIGS. 26A to 26C are process sectional views showing the defect repairing method for the liquid crystal display device according to the sixth embodiment of the present invention.
Figure 26B:
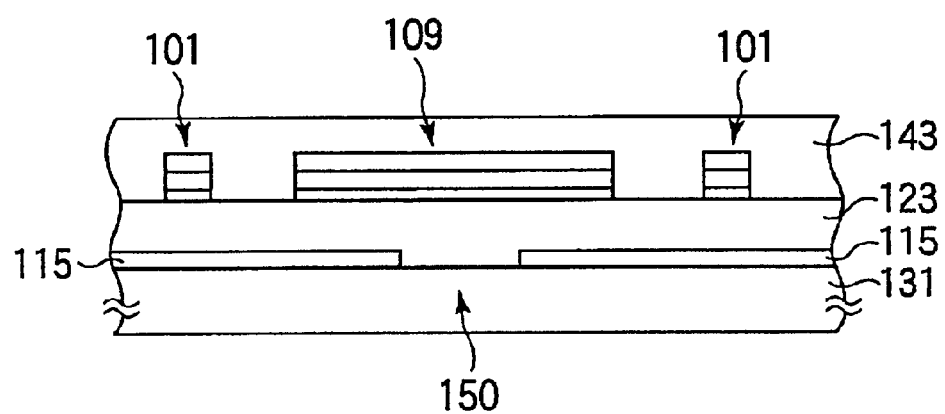
Figure 26C:
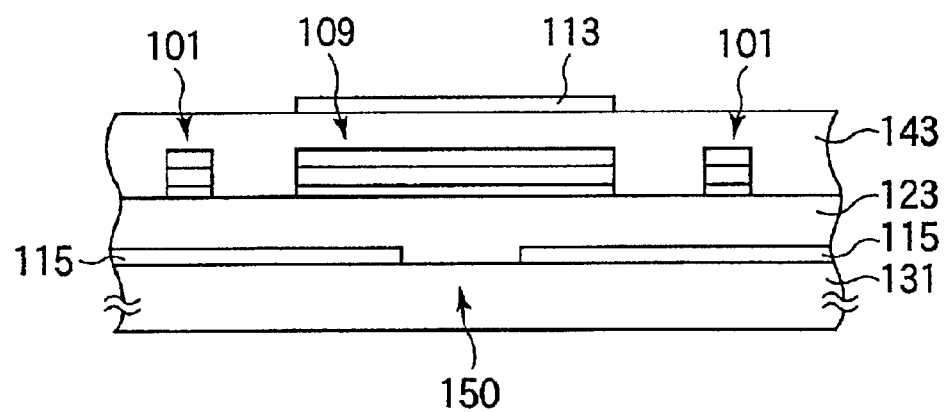

The defect repairing method for the liquid crystal display device according to this embodiment will be described more specifically with reference to FIGS. 26A to 27B. FIGS. 26A to 27B are process sectional views of the vicinity of the storage capacitor bus line 115 taken along line H–H' of FIG. 25, and show the defect repairing method for the liquid crystal display device according to this embodiment, together with a manufacturing process as its presupposition. Incidentally, structural elements having the same function and operation as structural elements shown in FIG. 9B and the like are designated by the same characters and the explanation is omitted. First, the manufacturing process of the liquid crystal display device according to this embodiment will be described. By substantially the same process as that shown in FIGS. 4A to 7B, the storage capacitor bus line 115, the storage capacitor electrode 109, and the drain bus line 101 are formed (FIG. 26A). Next, as shown in FIG. 26B, a protection film 143 made of, for example, a SiN film and having a thickness of about 300 nm is formed by a plasma CVD method. Next, as shown in FIG. 26C, a film of, for example, ITO having a thickness of about 70 nm is formed and is patterned to form the pixel electrode 113 on the protection film 143.

Figure 27A:
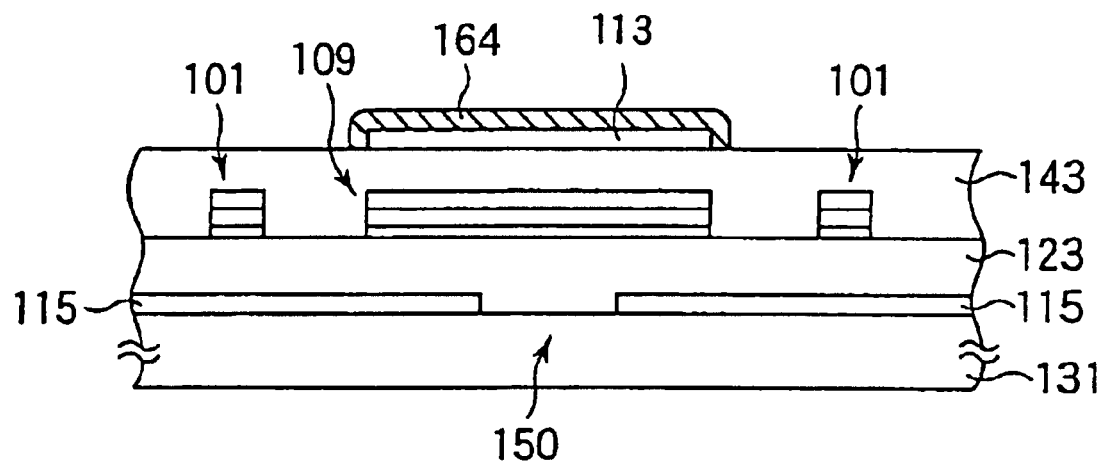
FIGS. 27A and 27B are process sectional views showing the defect repairing method for the liquid crystal display device according to the sixth embodiment of the present invention.

Next, the defect repairing method for the liquid crystal display device according to this embodiment will be described. First, as shown in FIG. 27A, the disconnection repairing insulating film 164 made of, for example, a silicon oxide film is formed on the pixel electrode 113 formed in the pixel region including the disconnection portion 150. The disconnection repairing insulating film 164 is formed by using an optical method such as a laser CVD method.

Figure 27B:
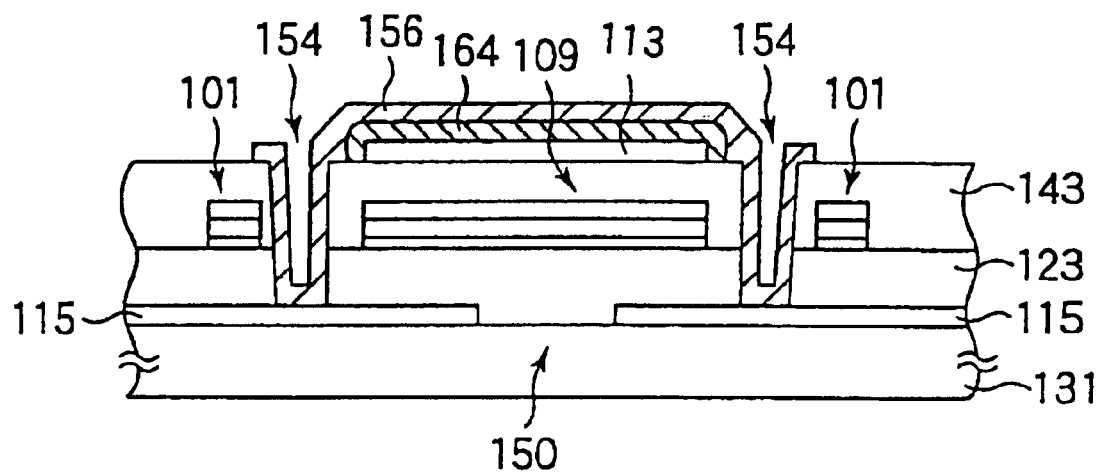
Figure 28:
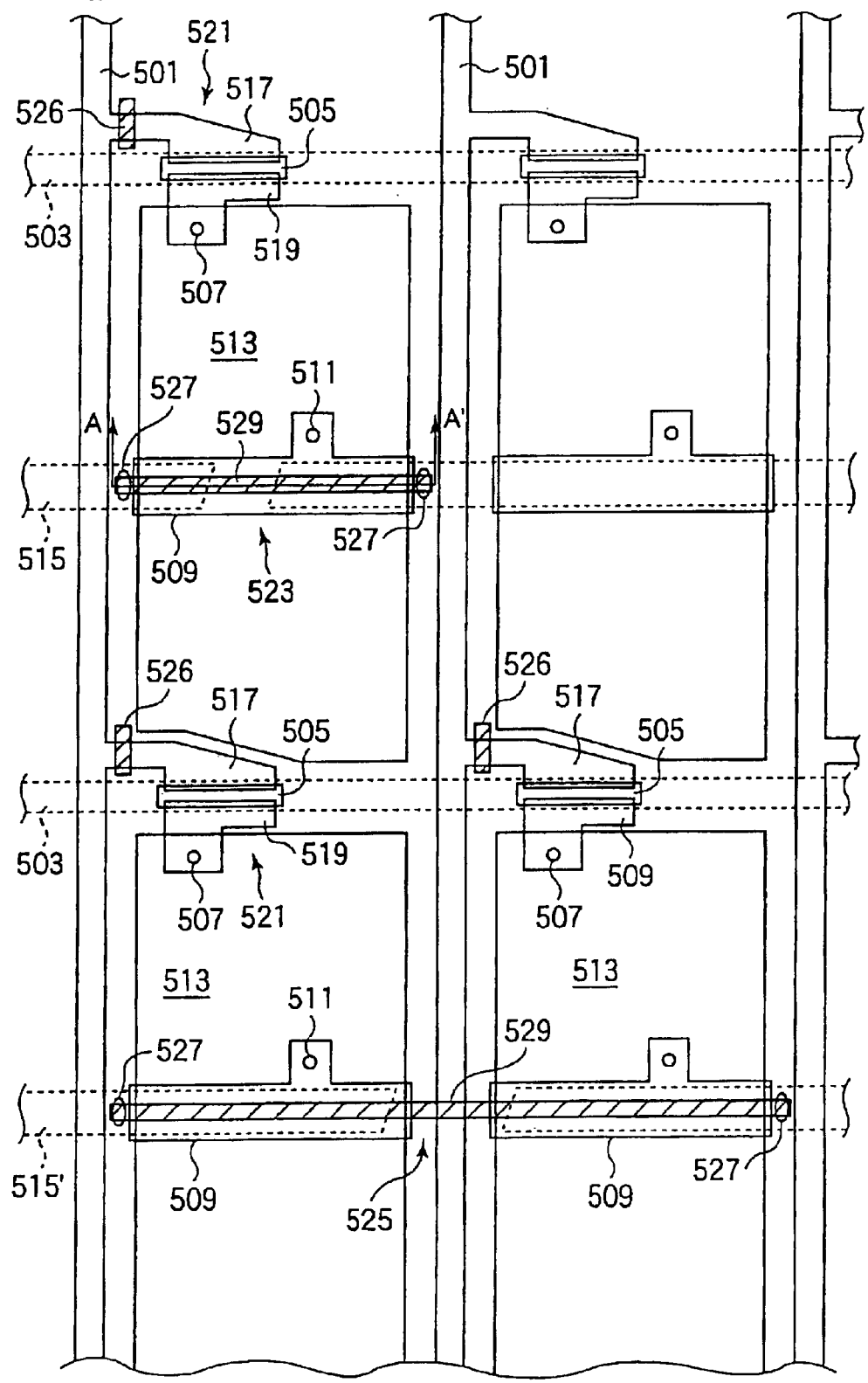
FIG. 28 is a plan view showing a conventional defect repairing method for a liquid crystal display device.
Figure 29A:
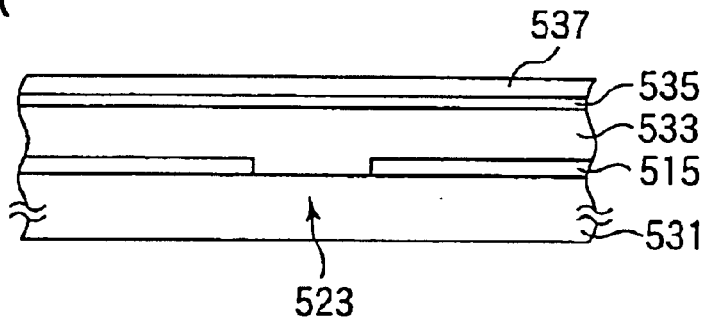
FIGS. 29A to 29D are process sectional views showing the conventional defect repairing method for the liquid crystal display device.
Figure 29B:
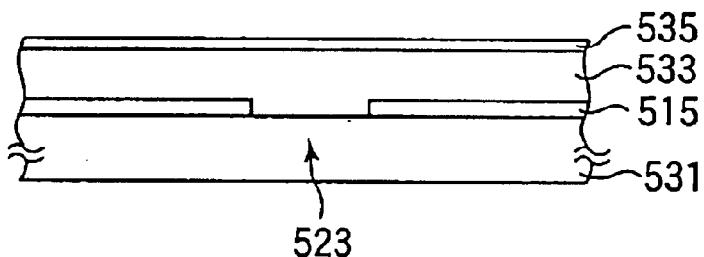
Figure 29C:
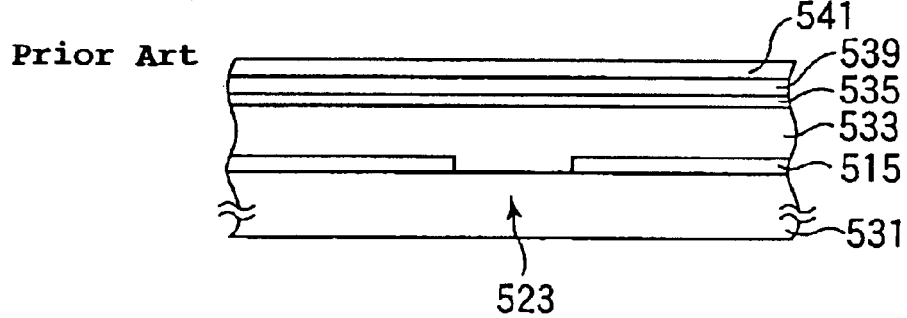
Figure 29D:
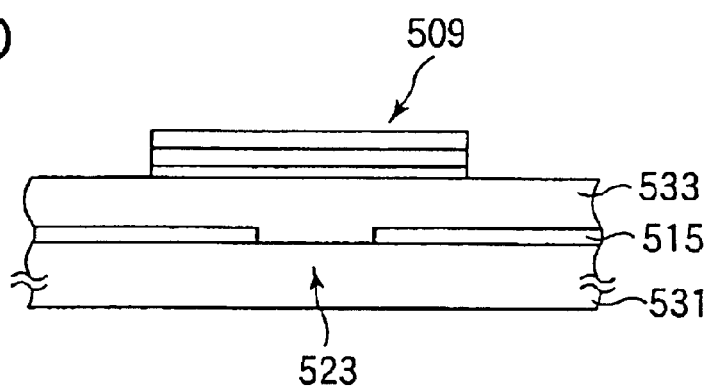
Figure 30A:
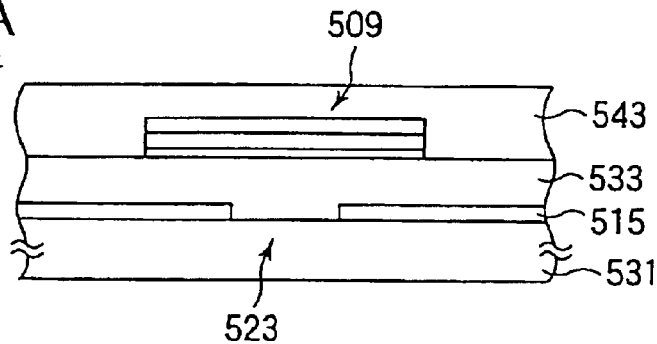
FIGS. 30A to 30D are process sectional views showing the conventional defect repairing method for the liquid crystal display device.
Figure 30B:
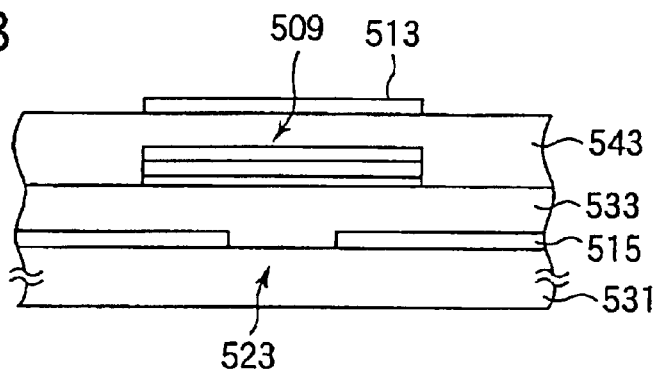
Figure 30C:
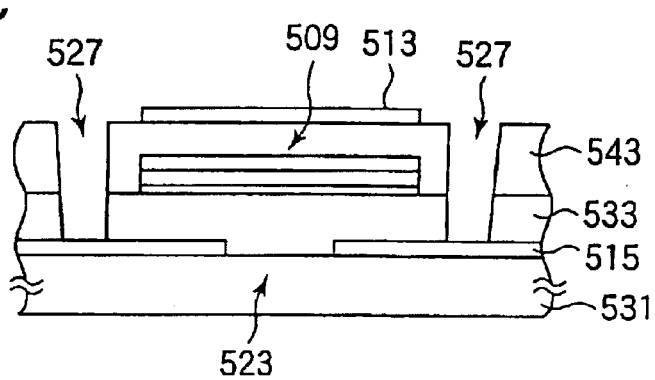
Figure 30D:
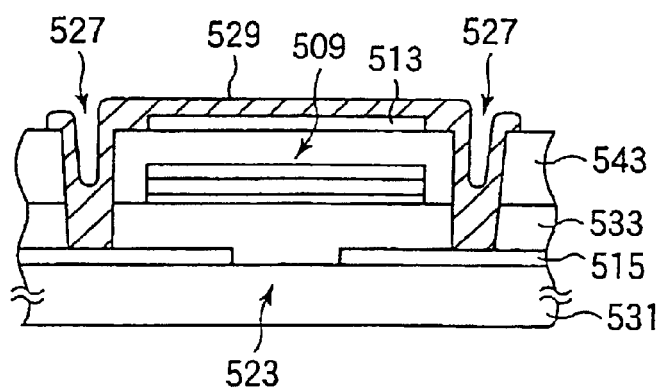

Next, as shown in FIG. 27B, the disconnection repairing contact holes 154 for exposing the storage capacitor bus line 115 are formed at both the end portions of the disconnection of the storage capacitor bus line 115 in which the disconnection defect occurs and in the regions where the pixel electrode 113 and the storage capacitor electrode 109 are not formed. The disconnection repairing contact holes 154 are formed by using a laser.

Next, the disconnection repairing conductive film 156 is formed on the disconnection repairing insulating film 164 without short-circuiting the pixel electrode 113. The disconnection repairing conductive film 156 for connecting both the end portions of the disconnection of the storage capacitor bus line 115 is formed by using the laser CVD method. Both the end portions of the storage capacitor bus line 115 are electrically connected to each other by the disconnection repair path constituted by the disconnection repairing conductive film 156, and the disconnection defect is repaired.

According to this embodiment, when the disconnection defects occurring in the storage capacitor bus lines 115 and 115' are repaired, since the disconnection repairing conductive film 156 and the pixel electrode 113 are not short-circuited, electrical insulation is kept between the storage capacitor bus lines 115 and 115' and the pixel electrode 113. Thus, it is not necessary to cut away the drain electrode 117 and the drain bus line 101, and the disconnection defect occurring in the storage capacitor bus line 115 can be repaired without producing a new point defect. Besides, the disconnection defect occurring in the storage capacitor bus line 115' in a wide range extending over two or more pixels can be repaired without producing a new connecting point defect.

The present invention is not limited to the above embodiments, but can be variously modified.

For example, in the third embodiment, although the disconnection repairing conductive films 158 are formed in all pixels, and adjacent pixels in the direction of the extension of the gate bus line 103 are connected to each other, the present invention is not limited to this. It does not matter if the disconnection repairing conductive films 158 are formed for every other pixel in the direction of the extension of the gate bus line 103. By doing so, since the disconnection repairing conductive films 158 are insulated from each other, a plurality of disconnection defects occurring in one storage capacitor bus line 115 can be repaired.

Besides, in the above embodiments, although the disconnection defect is repaired by using the single defect repairing method, the present invention is not limited to this, and the disconnection defect may be repaired by combining the plurality of defect repairing methods.

As described above, according to the present invention, the disconnection defect occurring in the storage capacitor bus line can be repaired without producing a new point defect.

What is claimed is:

1. A liquid crystal display device comprising:

an insulating substrate;

pixel regions arranged in a matrix form on the substrate;

storage capacitor bus lines formed to cross the pixel regions;

storage capacitor electrodes formed to be opposite to the storage capacitor bus lines through an insulating film; and two divided pixel electrodes formed in each of the pixel regions above the storage capacitor electrode at both sides of an electrically separated separation region, each of the divided pixel electrodes being electrically connected to the storage capacitor electrode.

2. A liquid crystal display device according to claim 1, wherein the separation region has a sufficient width to form a disconnection repairing conductive film of the storage capacitor bus line.

3. A liquid crystal display device according to claim 1, wherein each of the storage capacitor electrodes includes two protruding regions, and is electrically connected to the two pixel electrodes through contact holes formed in the two protruding regions.

* * * * *

UNITED STATES PATENT AND TRADEMARK OFFICE
CERTIFICATE OF CORRECTION

PATENT NO. : 6,940,579 B2
DATED : September 6, 2005
INVENTOR(S) : Kiyoshi Ozaki et al.

It is certified that error appears in the above-identified patent and that said Letters Patent is hereby corrected as shown below:

Title page,
Item [73], Assignee, delete "Sharp Corporation" and insert -- Sharp Kabushiki Kaisha --.

Signed and Sealed this

Twenty-second Day of November, 2005

JON W. DUDAS
*Director of the United States Patent and Trademark Office*